United States Patent [19]
Homer et al.

[11] Patent Number: 5,310,141
[45] Date of Patent: May 10, 1994

[54] BATTERY THERMAL CONTROL ARRANGEMENT

[75] Inventors: Peter K. Homer, Newtown; Paul V. Barcomb, Yardley, both of Pa.; Lisa M. Grob, Vincentown, N.J.

[73] Assignee: General Electric Co., East Windsor, N.J.

[21] Appl. No.: 948,229

[22] Filed: Sep. 21, 1992

[51] Int. Cl.$^5$ .............................. B64G 1/00
[52] U.S. Cl. ................. 244/158 R; 244/158 A; 244/173; 244/57; 136/222; 429/26
[58] Field of Search ............. 244/158 R, 158 A, 173, 244/57, 1 R; 136/222; 429/26

[56] References Cited

U.S. PATENT DOCUMENTS

| | | | |
|---|---|---|---|
| 3,749,156 | 7/1973 | Fletcher et al. | 165/32 |
| 4,162,701 | 7/1979 | Ollandorf | 244/1 R |
| 4,580,748 | 4/1986 | Dalby | 244/158 A |
| 4,630,791 | 12/1986 | Chapman | 244/173 |
| 4,842,050 | 6/1989 | Harper | 429/26 |

FOREIGN PATENT DOCUMENTS 2463058  3/1981  France .

Primary Examiner—David M. Mitchell
Assistant Examiner—Christopher P. Ellis
Attorney, Agent, or Firm—W. H. Meise; C. A. Berard; S. A. Young

[57] ABSTRACT

Cylindrical battery cell vessels are coupled together in plural sets by pairs of half-shell sleeves. The sleeves conduct heat preferentially in an axial direction. Each sleeve set is mounted onto a heat rejection plate for direct radiation to space. Each satellite of a set of spacecraft has a North and/or South-facing region for mounting the heat rejection plates of the requisite number of cells. Each plate may be fitted with an optical solar reflector (OSR) for reflecting insolation, and for radiating heat energy.

12 Claims, 18 Drawing Sheets

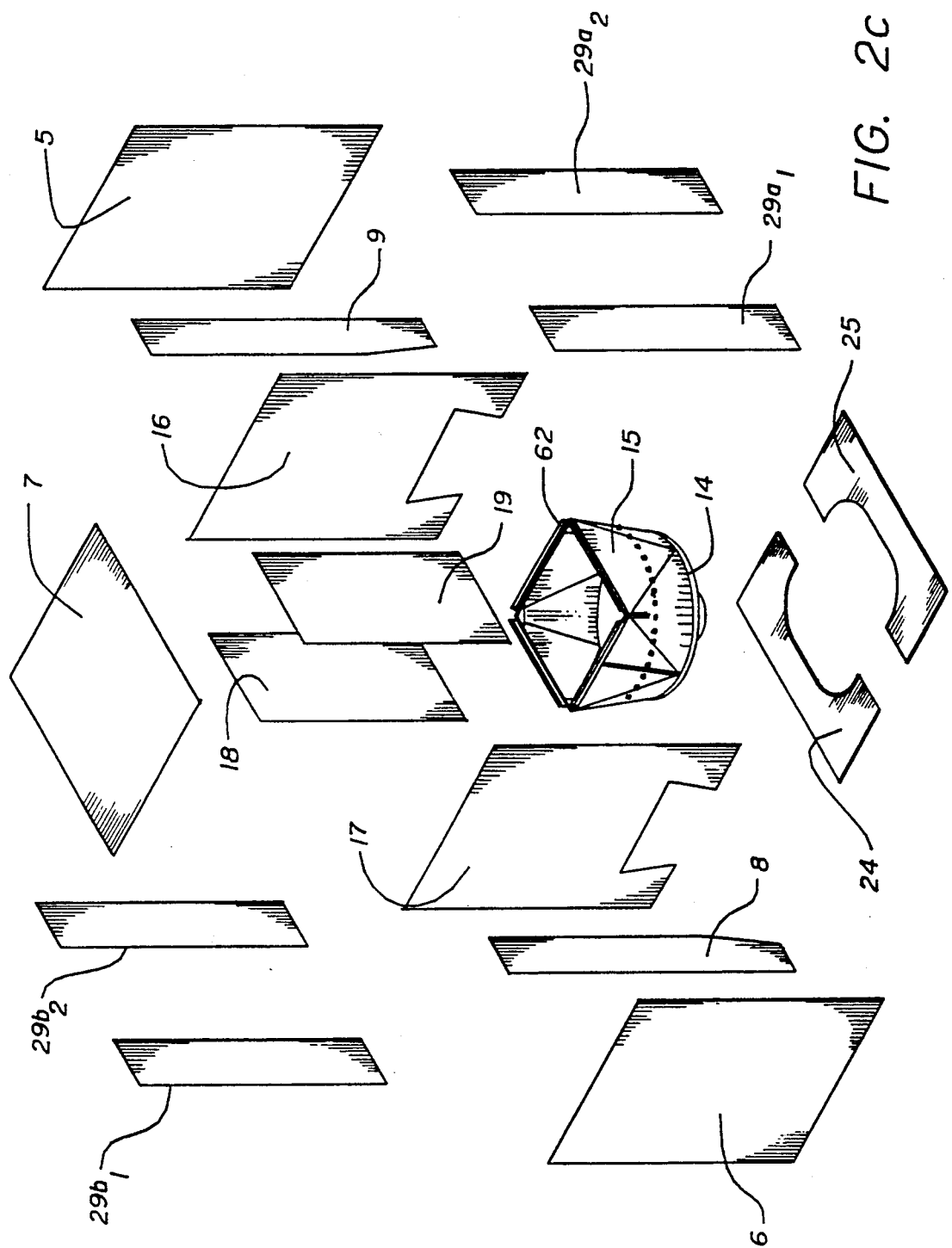

| ROW | COMPONENT | VARIABLE | MAX. | MIN. | INCREMENT |
|---|---|---|---|---|---|
| I | FUEL TANK: | LENGTH | 76 in | 36 in | 5 in |
| II | OXIDIZER TANK: | LENGTH | 68 in | 28 in | 5 in |
| III | SPACECRAFT SIZE: | BOX LENGTH | 85 in | 45 in | 5 in |
| IV | N-S PAYLOAD PNLS | LENGTH | 85 in | 45 in | 5 in |
| V | N-S HEAT PIPE NETWORK | LENGTH | 75 in | 35 in | 5 in |
| VI | N-S INTERCOSTAL PNLS | LENGTH | 84 in | 44 in | 5 in |
| VII | N-S BULKHEAD PNLS | LENGTH | 94 in | 54 in | 5 in |
| VIII | E-W INTERCOSTAL PNLS | LENGTH | 67 in | 27 in | 5 in |
| | SOLAR ARRAY: | | | | |
| IX | SUBSTRATE PNLS | AREA (EACH) | 63 sq ft | 40 sq ft | ONE OR OTHER |
| X | PANELS PER WING | QTY | 4 | 2 | 1 |
| | TO ACCOMMODATE C.G. POSITION: | | | | |
| XI | UPPER THRUSTERS (FROM S.P.) | HEIGHT | FIXED W.R.T. EARTH PNL | FIXED W.R.T. EARTH PNL | 5 in |
| XII | ARCJETS (FROM S.P.) | HEIGHT | TBDx | TBDx | ANYxx |
| XIII | LOWER THRUSTERS (FROM S.P.) | HEIGHT | (FIXED) | (FIXED) | (NONE) |
| XIV | MUX EXTENTSION PNLS: | OPTIONAL | — | — | YES OR NO |
| XV | EARTH HEATPIPES: | OPTIONAL | — | — | YES OR NO |
| XVI | BATTERY CELL PV'S: | QUANTITY | 56 per s/c | 22 per s/c | 2 per battery |

FIG. 4h

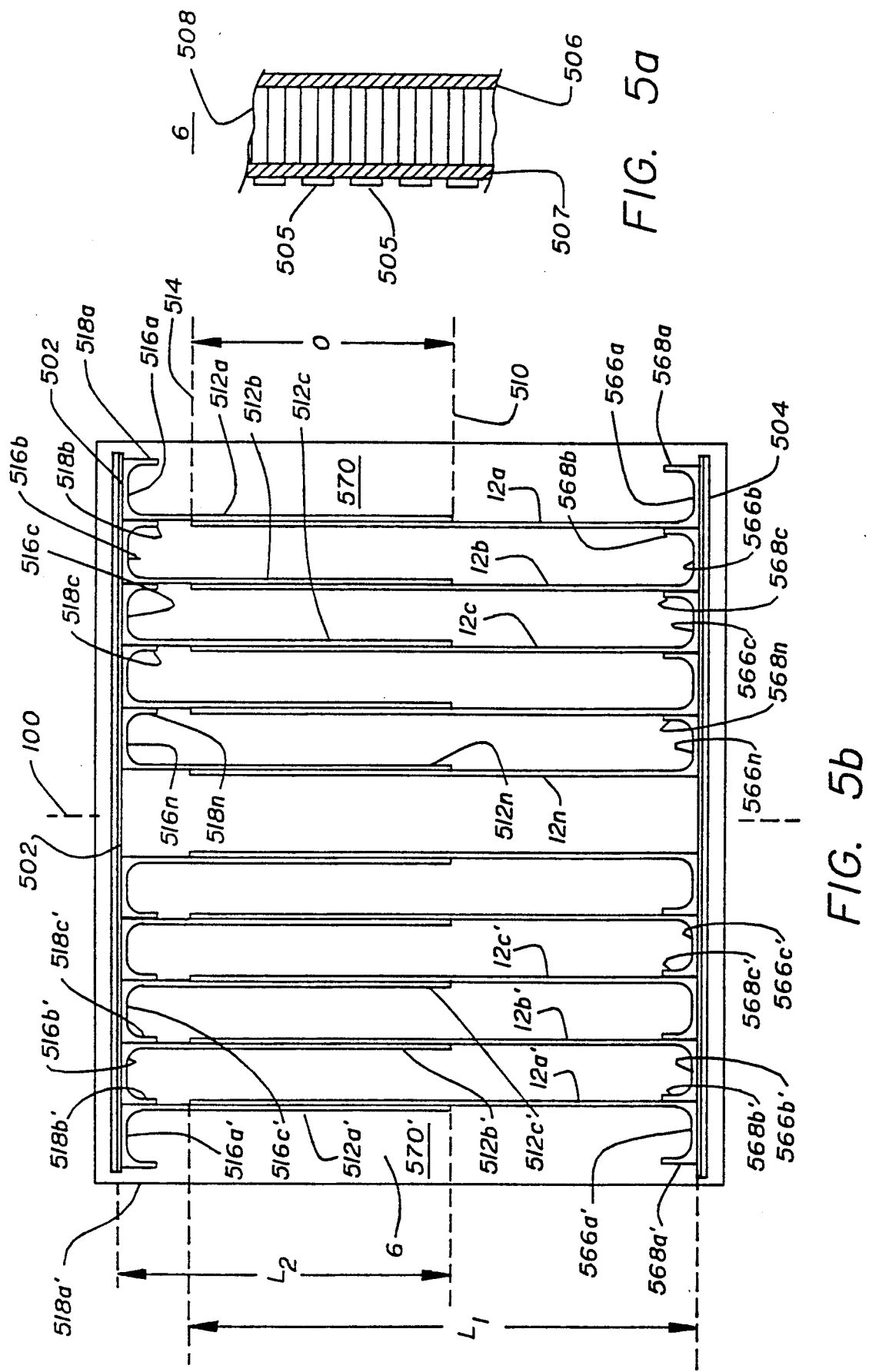

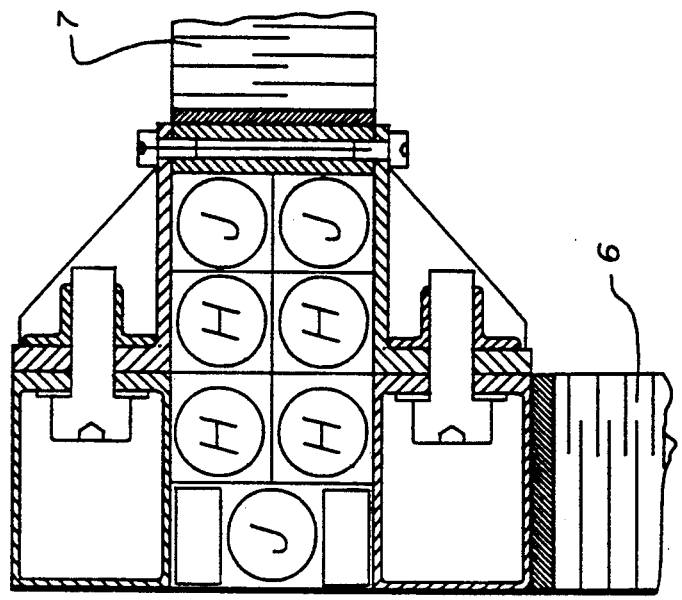
FIG. 6e
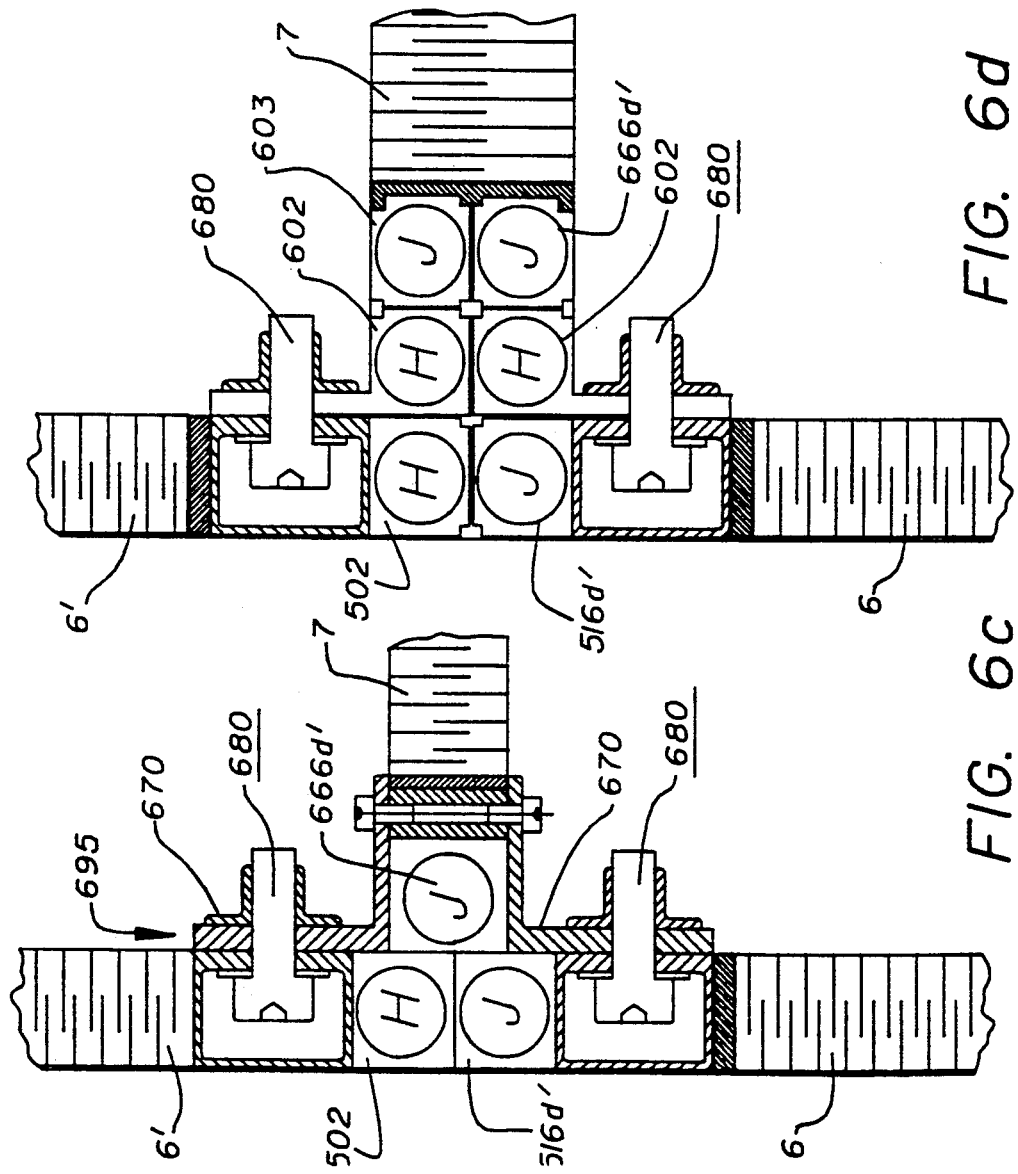
FIG. 6d
FIG. 6c

|  |  | 1a | 1b | 1c |
|---|---|---|---|---|
| I | LAUNCH VEHICAL | ATLAS II | DELTA II | ARIANE ∅ |
| II | BUS DRY MASS (Kg) | 750 | 580 | 450 |
| III | PAYLOAD MASS (Kg) | 450 | 170 | 150 |
| IV | PROPELLANT MASS (Kg) | 1500 | 1030 | 701 |
| V | LIFT-OFF MASS (Kg) | 2700 | 1780 | 1301 |
| VI | PAYLOAD SET | 24x12W-C 24x60W-Ku | 16x60W-Ku | 24x12W-C |
| VII | PAYLOAD POWER (KW) | 3.4 | 2.0 | .8 |
| VIII | ANTENNA(S) | 2x∅85° DUAL SURF. | 1x∅60° DUAL SURF. | 1x∅60° DUAL SURF. |
| IX | SPACECRAFT BOX LxWxH (in) | 72x72x85 | 72x72x65 | 72x72x50 |
| X | THERMAL RADIATION AREA (sq ft) | 70 | 50 | 35 |
| XI | OPERATIONAL/ ORBIT LIFT (yr) | 15 | 15 | 15 |

FIG. 7

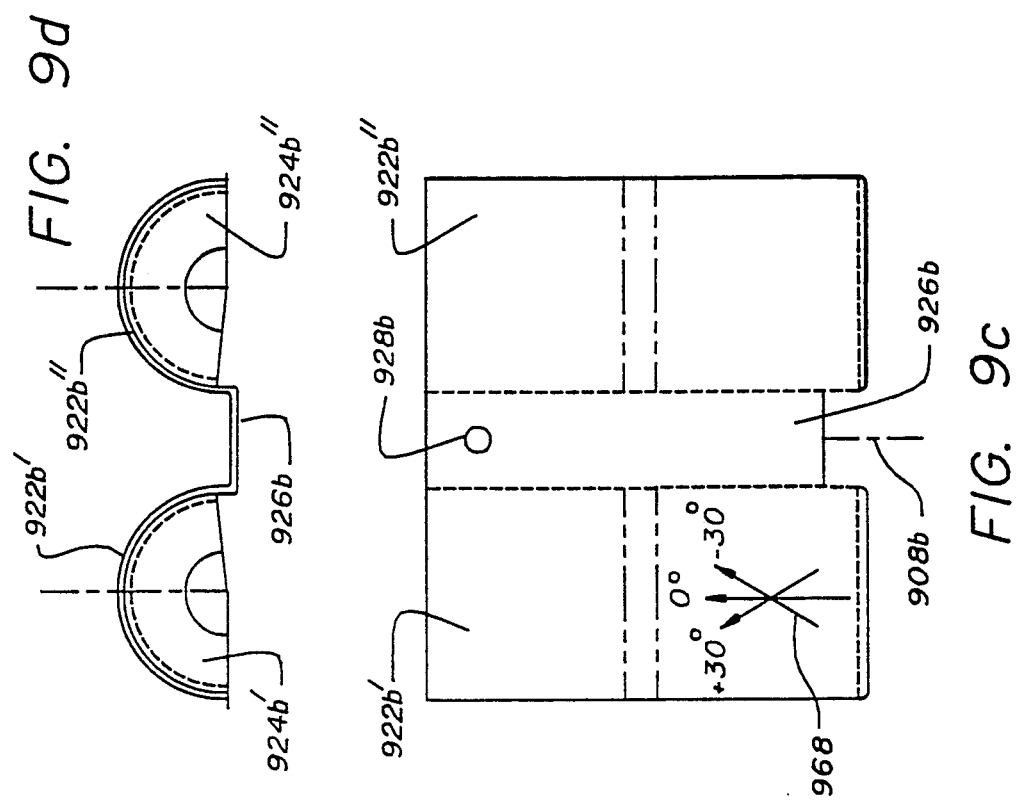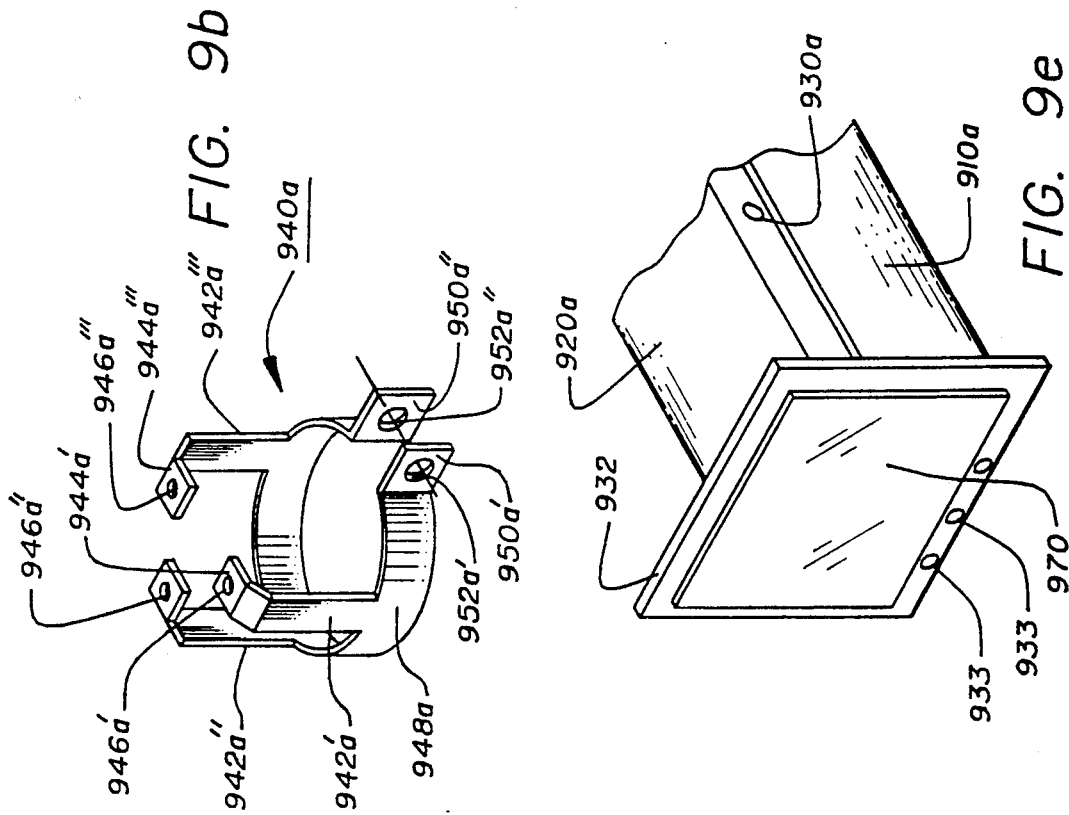

BATTERY THERMAL CONTROL ARRANGEMENT

BACKGROUND OF THE INVENTION

This invention relates to spacecraft, and more particularly to a heat rejection and control mounting for the cells of a battery.

Spacecraft have become important in the fields of communications, military surveillance, monitoring for ecologic conditions, global positioning determination and for weather, including advance notification of storms. The various differing payloads, mission durations and the like make it impossible to use a single spacecraft "bus" to carry the various payloads, because a small bus cannot carry sufficient propellant in addition to its payload for an extremely long mission, whereas a very large bus might be too expensive for the case of a small payload for a short-duration mission. Battery cells are temperature sensitive, and produce heat. Many spacecraft designs isolate the battery cells within the spacecraft structure for better temperature control. The different number of cells required for different missions thus requires detailed thermal analysis. Consequently, the satellite fabrication industry engages in extremely expensive crafting and customization, using such bits and pieces of the design of existing structures as may happen to meet the requirements of the job at hand. The resulting spacecraft must be individually space-qualified, because each differs markedly from the previous spacecraft. The individual crafting and space qualification tends to drive up the cost of the spacecraft and to increase procurement time. Lower costs are desired and shorter procurement times are desired.

FIG. 1 illustrates a spacecraft designated generally as 2100, which includes unfurled four-section solar panels designated 30a and 30b, a body designated generally as 1, including access panels 29a1 and 29a2, an oxidizer tank 20, a first mission-dependent antenna system including a dual-polarization reflector 31a1 and its feed 31a2, and a second reflector 31b1 and its feed 31b2, all as described in copending patent applications filed Sep. 21, 1992 entitled, "Low Cost, Selectable Configuration Spacecraft", in the name of Homer et al; "Spacecraft Thermal Panels & Make-Break Thermal Joints", in the name of Mackey et al; and "Spacecraft-to-Launch-Vehicle Transition", in the name of Homer et al.

FIG. 2a is a simplified, partially exploded perspective or isometric view of spacecraft 2100 of FIG. 1 in its stowed state. In its stowed state, protruding elements, such as solar panels 30a and 30b, and deployed reflectors 31a1 and 31b1 of FIG. 1, are collapsed into close proximity with the main body of the spacecraft, so as to allow the spacecraft in its stowed state to be accommodated within the relatively confined interior of a launch vehicle. Elements of FIGS. 2a, b and c corresponding to those of FIG. 1 are designated by like reference numerals. In FIG. 2a, main body 1 of the spacecraft bus is surrounded by a dash line. Main spacecraft body 1 is generally centered on a longitudinal axis 100. Longitudinal axis 100 is parallel to the axis of a launch vehicle (not illustrated in FIG. 2a). Within main body 1, a payload module portion is designated generally as 2, and includes a north transponder panel assembly 5, a south transponder panel assembly 6, and an earth panel assembly 7, in which the terms "north", "south", "earth" and the like refer to a preferred orientation when the spacecraft is in normal operation. Main body 1 also includes a core module designated generally as 3, which includes a north intercostal panel assembly 16, a south intercostal assembly 17, an east intercostal panel assembly 18, and a west intercostal panel assembly 19, as well as a pair of oxidizer tanks 20 and 21, and a fuel tank 22. Main body also includes a bus module designated generally as 4, which includes an east base panel 24 and a west base panel 25. The Main body 1 further includes a south bulkhead panel 8, a north bulkhead panel 9, southwest access panel 29a1, northwest access panel 29a2, southeast access panel 29b1, and northeast access panel 29b2. The various panels and their associated reference numerals are illustrated separately in FIG. 2c. In general, payload module 2 is arranged to be supported by core module 3, and both payload module 2 and core module 3 are provided with attitude control, electrical power control, and other services by bus module 4 after launch.

In addition to main body 1, the structure of FIG. 2a includes a stowed north-side solar array panel assembly 30a, and a stowed south-side solar array panel assembly 30b. Antenna reflector 31a1 and its feed 31a2 are illustrated in close proximity on the west side of the spacecraft. Similarly, on the east side, stowed reflector 31b1 is in close proximity to its feed 31b2. Two sets of access panels designated 29a1, 29a2 and 29b1 and 29b2, are illustrated exploded away from their normal positions, which are between intercostal panel assemblies 16, 17 and corresponding portions of transponder panel assemblies 5 and 6.

FIG. 2 also illustrates a bulkhead panel 8, which lies between south transponder panel assembly 6 and south intercostal panel assembly 17, and a further bulkhead panel 9 which lies between north transponder panel assembly 5 and north intercostal panel assembly 16. An optional extension panel designated 10 extends south transponder panel 6, and a similar panel extension 11 extends north transponder panel 5. Various boxes designated 13a, 13b, 13c, 13d, 13e and 13f are mounted on panel extensions 10 and 11, on earth panel 7 and on the interior of north transponder panel 5. Boxes 13 represent portions of the payload, which may vary from mission to mission.

A portion of the outer surface 507 of south transponder panel 6 and the interior support honeycomb in FIG. 2a is cut away, to reveal portions of heat pipes designated 12 and the reverse surface 506 of panel 6. A portion of the outer surface 597 of earth panel 7 is similarly cut away to reveal portions of its heat pipes 612. The heat pipes are further described below in conjunction with FIGS. 5 and 6. A few of the optical surface radiators (OSRs) 505 are illustrated, mounted on surface 507 of transponder panel 6.

An unmanned launch vehicle such as Atlas, Delta or Ariane generally includes a support or adapter ring which supports the spacecraft during lift into orbit. In FIG. 2a, the launch vehicle adapter ring is illustrated as 14. A transition support illustrated as 15 transfers forces between adapter ring 14 and various panel members of core module 3, such as intercostal panel assemblies 16, 17, 18 and 19. As described below in conjunction with FIGS. 3a, 3b, 3c and 3d, transition 15 is a reinforced composite ring of varying cross-sectional shape, the circumference of which remains constant along its axial length. A series of projecting tabs, individually designated 60, are associated with transition 15, for providing support for base panels 24 and 25 of bus module 4. FIG.

2a also illustrates various attitude control thrusters, which are designated 23, and which are connected by propellant and control lines to core module 3. Bus electrical components 26, reaction or momentum wheels 27, and battery modules 28 are mounted on bus module 4. A portion of an apogee thruster 35 is visible, projecting below core module 3.

FIG. 2b illustrates core module 3, further exploded to reveal interior details. Elements of FIG. 2b corresponding to those of FIG. 2a are designated by like reference numerals. In FIG. 2b, the structure of intercostal panel assemblies 18 and 19, and their interface with the upper end of support transition 15 may be seen. Also, it is evident from FIG. 2b that oxidizer tanks 20 and 21 are supported at their tops and bottoms by support struts illustrated as 33, and fuel tank 22 is supported at its top by support struts 34.

FIG. 3a is a perspective or isometric view of launch vehicle adapter ring 14, support transition 15, and upper "ring" 62. Upper ring 62 provides the interface between transition 15 and the intercostal panels 16, 17, 18 and 19 of FIG. 1. Since the intercostal panels are straight, upper support "ring" 62 is formed of straight segments 62a, 62b, 62c and 62d in a square or rectangular configuration. Each section, such as section 62b, of upper support ring 62, includes an upper socket portion 63 dimensioned to accept an intercostal panel, such as intercostal panel 19 illustrated in the cross-sectional view of FIG. 3b. Ring portion 62b of FIG. 3b also includes a lower socket portion 64 dimensioned to accept the upper edge of transition support element 15. As also illustrated in FIG. 3b, launch vehicle adapter support ring 14 includes a lower socket, circular in form, dimensioned to accept the lower edge of transition support structure 15. The spacecraft with its transition support structure is held to launch vehicle adapter support 14 by a clamp band (not illustrated), which is released at the time of separation. Referring once again to FIG. 3a, transition support structure 15 supports the intercostal panels, as mentioned above, by way of upper support ring 62. A portion of the load of the spacecraft is also applied part-way down the transition by a series of protruding tabs 60. Tabs 60, in association with the lower part of transition 15, transfer loads between launch vehicle adapter ring 14 and east and west base panels 24 and 25 of bus module 4, illustrated in FIG. 2a. FIG. 3c is a cross-sectional view through a portion of transition support member 15 at a tab 60, illustrating how protruding tabs 60 are positioned for attachment to east base panel 24. The actual connection may be by an adhesive, bolts, or a combination. Items 65 and 66 of FIG. 3a, and their counterparts (not visible) on the other side of the transition, are protruding tabs for attachment of the transition support to the north and south bulkheads, and north and south intercostal panels, respectively.

FIG. 3d illustrates support transition 15 during its fabrication. As mentioned, support transition 15 is a reinforced composite structure. The upper end of transition 15 has the overall form of a square (or rectangle, or other polygon, if desired) with rounded corners, and the lower end is circular. In one embodiment, the structure is fabricated using carbon reinforcing fiber tape laid up on a mold, and impregnated with a resin matrix. FIG. 3d illustrates a reinforcing fiber tape 67a in the process of being laid from the lower edge toward the upper edge, along a longitudinal track 67b illustrated by dash lines. As mentioned, the circumference of support transition 15 at any plane orthogonal to longitudinal axis 100 is equal to that at any other plane. This has the advantage that, when tapes 67a are laid along longitudinal tracks 67b, they may be laid side-to-side without overlapping at the top, as would be the case if the support transition were smaller in circumference at the top than at the bottom. Consequently, support structure 15 does not become thicker toward the top (due to the overlap of the tapes) compared with the bottom, but remains of the same thickness throughout its axial length. Such increased thickness at the top would undesirably add weight to the vehicle, and provides additional strength in regions in which it is not necessary. The forces during launch are greatest near the bottom of the transition, as a result of torques, which act through a moment arm equal to the axial length of the support transition, and also because support tabs 60, described above in conjunction with FIGS. 3a and 3c, cause some of the loads to be applied to support transition 15 half-way down the transition. Thus, strength is needed at the bottom, not the top. The constant circumference of support transition 15 has a further advantage, in that a layer of reinforcing fiber tape, such as 67c of FIG. 3d, which is applied to the structure along a track illustrated as 67d which is at some selected angle, such as 45°, relative to the longitudinal axis 100, will maintain that same (45°) angle throughout its entire track from the lower edge to the upper edge of the structure. Thus, the known characteristics of successive layers of longitudinal and ±45°-oriented fiber reinforcements can be relied upon. If the circumference were not constant along the length of the transition, the angle of track 67d would vary along its length, with the result that, under extreme conditions, track 67d might take on angles resulting in a return of the tape to the lower edge, rather than continuing to the upper edge. In any case, the angle of the fiber reinforcement could not be guaranteed.

FIG. 4a illustrates, superimposed upon one another, various members, designated $2100^1$, $2100^2$, $2100^3$ ... of a set of spacecraft. FIG. 4a is merely illustrative, and the set of spacecraft may have more or fewer members than 5. Each member of the set has an axial length, measured in the direction of longitudinal axis 100, which is different from that of other members of the set. For example, member $2100^1$ of FIG. 4a is shorter than member $2100^2$. The longest member of the set illustrated in FIG. 4a is $2100^5$. The lateral or cross-sectional dimensions W1 of all member spacecraft of the set of spacecraft of FIG. 4a are identical, so that they may be fitted within the same launch vehicle. Naturally, payload-specific portions, while they must lie within the confines of the launch vehicle, may deviate from this requirement.

As mentioned, low cost is achieved when certain standardized incremental axial dimensions are used, which as an example may be five inches. The length dimension difference among the members 2100 of the set of FIG. 4a is five inches. FIG. 4b represents a range of sizes of the combination of support transition element 15 and core modules 3 which are associated with the various members of the set illustrated in FIG. 4a. The cross-sectional dimensions, as represented by dimensions $W_2$ of core module $3^1$ and $3^5$ of FIG. 4b, are identical for all members of the set of spacecraft. As illustrated in FIG. 4b, a core module 31 is associated with the shortest axial length member, $2100^1$, of the set of spacecraft illustrated in FIG. 4a. A longer core module $3^5$ is associated with the longest member, $2100^5$, of the set of spacecraft illustrated in FIG. 4a. Other members of the set of spacecraft of FIG. 4a having axial lengths lying between the extremes will have core module lengths lying between the two lengths illustrated in FIG. 4b. FIG. 4c illustrates a spherical fuel tank $22^1$, which is associated with the shortest member, $2100^1$, of the set of spacecraft of FIG. 4a. As illustrated, fuel tank $22^1$ is made up of two hemispheres 222. FIG. 4c represents a range of fuel tank sizes created by adding cylindrical portions, such as cylindrical portion 223, between hemispheres 222. Cylindrical portion 223, together with end hemispheres 222, form a fuel tank $22^5$ elongated in the direction of axis 100, which is associated with the longest member of the set of spacecraft of FIG. 4a, namely member $2100^5$. Other spacecraft of the set will have fuel tanks 22 with lengths lying between the lengths illustrated in FIG. 4c, by addition of other lengths of cylindrical portion 223. The length increments of cylindrical portions 223 of the fuel tanks are five inches, to correspond to the other length increments illustrated in FIGS. 4a through 4g. It will be clear that all of the fuel tanks $22^1 \ldots 22^5$ of FIG. 4c will have identical cross-sectional dimensions in a plane perpendicular to longitudinal axis 100. The increased length of fuel tank provided by the addition of cylinder 223 increases the tank's volume, so a longer spacecraft can carry more fuel, without being larger in lateral dimensions. This method of increasing the volume of the tank is particularly important, because the incremental cylindrical tank portion does not result in a need to space-qualify the different volume tank.

FIG. 4d represents a south transponder panel assembly 61 having a first length in the direction of axis 100, and represents a range of sizes in predetermined increments of five inches, up to a length represented by south transponder panel assembly $6^5$. The width dimension $W_4$ of panel $6^1$ is equal to that of panel $6^5$. The longest panel assembly $6^5$ is associated with the longest member spacecraft, member $2100^5$, of the set of spacecraft illustrated in FIG. 4a, while panel 61 of FIG. 4d represents the south transponder panel assembly associated with the shortest member spacecraft, member $2100^1$, of the set of FIG. 4a. The overall dimensions of body 1 of the spacecraft of FIG. 2a are established at least in part, by the widths of transponder panels 5 and 6, and in the other direction by the widths of intercostal panels 18 and 19 and bulkhead panels 8 and 9. So long as the widths of these panels are identical among members of a set of spacecraft, the cross-sectional dimensions of the spacecraft will be the same from one member of the set to the other. Naturally, other panel assemblies, such as those described in detail in conjunction with FIGS. 2a, 2b and 2c, may be extended in axial length in a similar manner. The increase in the axial length of the transponder panels of longer spacecraft of the set, compared with shorter spacecraft, increases the heat rejection capability of the spacecraft relative to a shorter spacecraft. Therefore, a longer spacecraft of a set can carry a higher-power payload, without change in the lateral dimensions, than a shorter spacecraft. The increase in axial length of the transponder panels of longer spacecraft of the set also increases the available mounting area and volume available for mounting payload boxes.

FIG. 4e represents a solar panel 301, which has a dimension in the direction of axis 100 which is less than the corresponding dimension of another solar panel $30^5$, but all of which have a common lateral dimension $W_5$. FIG. 4e represents a range of values in predetermined increments of five inches. Each solar panel represented by FIG. 4e is associated with a corresponding length member spacecraft of the set of spacecraft of FIG. 4a, for providing greater surface area notwithstanding the constant panel width $W_5$, to thereby provide, when deployed, increased power generation for the longer spacecraft.

FIG. 4f represents a range of oxidizer tanks which may be used with the various different length members of the set of spacecraft of FIG. 4a. The smallest member of the set of tanks illustrated in FIG. 4f is designated $20^2$, suggesting that the set may include a smaller member tank, if desired, which would be in the form of a sphere (not illustrated) including two hemispheres 220. As illustrated, member $20^2$ is formed of two hemispheres 220, together with a cylindrical portion $221^2$. The largest tank of FIG. 4f is designated $20^5$, and includes hemispheres 220 and a longer cylindrical portion $221^5$. The diameters of hemispheres 220 are identical, so the cross-sectional dimensions of all oxidizer tanks $20^x$ of a set of spacecraft are identical, where superscript x is an index representing any one of the members. The volume of tanks 20, of course, increases with increasing length, so more oxidizer can be fitted within a longer member of the set of spacecraft than within a shorter member, without further space qualification.

FIG. 4e represents as structures $50^1$ and $50^5$, heat pipe assemblies of various lengths, each of which may be associated with a panel, such as a transponder panel, of a member of the set of spacecraft of FIG. 4a. The heat pipe assemblies are further described below in conjunction with FIGS. 5 and 6. As illustrated in FIG. 4g, "vertical" portions of the heat pipes may be elongated in a direction parallel with longitudinal axis 100. The lengths of the heat pipes may be adjusted in increments to adjust the area available for thermal radiation to match the panel heat rejection capability to the requirements of high or low power payloads. Thus, while the panels change dimensions, the heat pipe structures may or may not change length, depending upon the payload heat load.

FIG. 4h tabulates some of the variables associated with a particular set of spacecraft being planned. Row I indicates that the fuel tank length ranges from a minimum of 36 inches in the longitudinal direction to a maximum of 76 inches, in 5-inch increments. Rows II through VIII are self-explanatory. Row IX indicates that the solar array panels each have a maximum area of 63 square feet, and a minimum of 40 square feet, and "one or the other" means that the initial plans, for cost and manpower reasons, is limited to one increment, which is a multiple of five inches. It is expected that later spacecraft members of the set will include intermediate dimensions. As also listed in Row XI of FIG. 4h, upper thrusters 23a, illustrated in FIGS. 2a and 2b, are fixed with respect to earth panel 7, and as the transponder panel lengths increase in 5" length increments, upper thrusters 23a also become more distant from the launch vehicle separation plane (S.P.) by 5" increments. The position of arcjets 236 listed in Row XII is "TBD", to be determined based on the specifics of the mission and the resulting location of the center of gravity (CG). The lower thrusters 23c are at a fixed height with respect to the launch vehicle separation plane. The multiplex (MUX) extension panels 616 listed in Row XIV and the Earth heat pipes in Row XV are described in conjunction with FIG. 6a. The number of nickel-hydrogen battery cell pressure vessels (Pvs) are listed in Row XVI.

FIG. 5a is a cross-section of a portion of south transponder panel 6 of FIG. 2a, illustrating an inner face sheet 506, face sheet 507, and an interior low density core in the form of a honeycomb 508. As known, the face sheets and honeycomb are conventionally made from aluminum for low cost, light weight and good thermal conduction, but may be of other materials. In particular, face sheets of carbon fiber reinforced resin are contemplated. FIG. 5b is an elevation view of panel 6 with face sheet 507 and the honeycomb filling 508 removed, to expose the heat pipes extending therethrough. As illustrated in FIG. 5b, a first "header" heat pipe 502 extends from left to right across the top of panel 6, and a second header heat pipe 504 extends from left to right across the bottom of the panel. Also in FIG. 5b, a first set of heat pipes, designated generally as 570, lying between header heat pipes 502 and 504, includes a heat pipe 12a, which has a straight portion which extends upwardly from header 504 to a plane 514 transverse to axis 100. Heat pipe 12a includes, in addition to the straight portion, a portion in the general shape of a letter "J", with a bottom portion 566a in thermal contact with header pipe 504, and with a "hook" portion 568a which extends upwardly a short distance away from header heat pipe 504. The "hook" portion of the heat pipe is a location in which excess heat transfer liquid tends to accumulate when ambient conditions create such an excess. Heat pipe set 570 of FIG. 5b includes another heat pipe designated 512a, which also includes a straight portion which extends downwardly from header heat pipe 502 to a transverse plane 510 which lies below transverse plane 514. Heat pipe 512, in addition to the straight portion described above, also includes a portion in the general shape of the letter "J", including a "bottom" portion 516a and a "hook" portion 518a which extends downwardly a short distance. In an overlap region O lying between transverse planes 510 and 514, the straight portions of heat pipes 12a and 512a are juxtaposed and in thermal contact.

A plurality of additional sets or pairs of heat pipes 12, 512 are arranged between upper header heat pipe 502 and lower header pipe 504. For example, a heat pipe 12b includes a straight portion extending upwardly from header heat pipe 504 to transverse plane 514, and a J-shaped portion including a bottom portion 566b in thermal contact with header 504, and a hook portion 568b extending upwardly a short distance from header 504. The hook portion of heat pipe 12b is in thermal contact with heat pipe 12a. Heat pipe 12b is juxtaposed in region 0 with a straight portion of a heat pipe 512b, which extends downward from header 502, and which also includes a bottom portion 516b extending along header 502, and a hook portion 518b, extending downwardly from header heat pipe 502, which is in contact with the straight portion of heat pipe 512a Additional heat pipe pairs 12c, 512c . . . 12n, 512n, each with its associated bottom portion 566c, 516c. . . 566n, 516n and hook portion 568c, 518c . . . 568n, 518n, respectively, provide heat distribution throughout panel 6. An additional set of heat pipes similar to that described above, and designated generally as 570', is symmetrically disposed about axis 100 in FIG. 5b relative to set 570. The numbering of heat pipes of set 570' is the same as that of the heat pipes of set 570, with the addition of a prime. As mentioned, FIG. 5b represents south transponder panel 6 of FIG. 2a, and a similar set of heat pipes is embedded within north transponder panel 5, as illustrated below in conjunction with FIG. 6a.

In general, one of north or south transponder panels 5 or 6 of FIG. 2a will be facing a cold region of space, and will not be subject to heat loading from the sun. That transponder panel will radiate thermal energy to space through its optical surface radiators (OSRs) 505. Heat pipes 12 and 512 associated with panel 6 distribute heat "vertically" through the panel to tend to equalize temperature. Overlap region 0 is particularly suited for the mounting of higher-power portions of payload modules 13 (FIG. 2a), because heat generated within overlap region O is carried both upward (by heat pipes 512) and downward (by heat pipes 12).

As mentioned in conjunction with FIGS. 4a–4g, the heat rejection capability of the transponder panels increases as the dimension of the heat pipe network in the direction of axis 100 increases. FIG. 5c illustrates a south transponder panel 506, with a heat pipe network 12, 512 which is axially extended compared with that of FIG. 5b (longer in the direction of axis 100 than in the panel of FIG. 5b), but in which individual the heat pipes 12, 512 have the same physical lengths as in FIG. 5b. That is, lengths L1 of heat pipes 12 of FIG. 5b are equal to lengths L1 of heat pipes 12 of FIG. 5c, and lengths L2 of heat pipes 512 of FIG. 5b are equal to lengths L2 of heat pipes 5 of FIG. 5c. Overlap region 01, however, is shorter than overlap region 0 of FIG. 5b, so the area within which higher power payload components may be installed is smaller. Such an arrangement, in which different members of a set of spacecraft have the same length heat pipes, notwithstanding that the panel itself and the heat pipe network are longer, is advantageous when heat pipes of a particular length are stocked in inventory, and cutting is not desired.

FIG. 5d illustrates a panel $506^2$ corresponding to panel 506 of FIG. 5c in dimensions, but in which heat pipes 12 and 512 are lengthened to lengths $L_1^1$ and $L_2^1$, respectively, to maintain overlap region 0 identical in size to overlap region 0 of FIG. 5b. Both extended panels 506 and $506^2$ have the same area, and therefore ultimately have the same heat rejection capability for a given temperature rise, but the heat distribution capability and thermal radiation in the presence of high power payload components will be improved in the arrangement of panel $506^2$ of FIG. 5d. Such an arrangement, in which the heat pipes themselves are adjusted in length, may be desirable when long heat pipes can be fabricated, which are pinched off, cut at the pinch, and welded closed, to produce the desired length.

FIG. 6a represents north and south transponder panels 5 and 6, and earth panel 7 of FIG. 2a, skeletonized by removal of OSRs 505, surface sheets 507 and honeycomb core 508 of panel 6, and by removal of most of a surface sheet 597, and all of the honeycomb of panel 7 to expose the entire heat pipe configuration of those panels. In FIG. 6a, the heat pipe arrangement of panel 6 is similar to that described in conjunction with FIG. 5b, and corresponding elements are designated by the same reference numerals. Elements of north transponder panel 5 corresponding to those already described in conjunction with south transponder panel 6 are designated by the same reference numerals primed. In FIG. 6a, a set of heat pipe pairs, one of which is designated as 612, is incorporated into earth panel 7. Heat pipes such as 612 are in juxtaposed pairs, with J-shaped ends, similar to the heat pipe pairs 12, 512 of transponder panel 6. The J-shaped ends of heat pipe pairs 612 of earth panel 7 abut header pipes such as 502 or 502¹. This allows heat flow across panel 7, from header 502 to header 502₁, and vice versa. The heat transfer from panel to panel is accomplished in a heat transfer region designated 695, as for example heat transfer between panels 6 and 7 occurs in heat transfer region 695a, and, between panels 5 and 7, in region 695b. The arrangement illustrated in FIG. 6a has the advantage that, when one of north or south transponder panels 5 or 6 is hotter than the other, as may occur, for example, due to sun loading or due to an unbalanced heat load, heat will travel upward along that transponder panel, will transfer by way of a header heat pipe 502 in a heat transfer region 695 to the heat pipes 612 of earth panel 7, through heat pipes 612 to the header pipe of the other, cooler one of the north or south transponder panels, and will raise the temperature of the initially cooler panel. The increased temperature results in rejection of the heat. Also, the header heat pipe tends to decrease transverse temperature gradients across the panels. Thus, the heat rejection capability of the spacecraft as a whole is enhanced. Additionally, that portion of the heat load produced by payload components, such as components 13a, 13b, and 13c of FIG. 2a which are mounted on earth-facing panel 7, which exceeds the heat rejection capability of panel 7, is transferred efficiently along heat pipes 612 to header pipes 502, 502¹, and transferred to the transponder panels 5 and 6 for rejection thereby. Regions 615 and 616 of north and south transponder panels 5 and 6 lack heat pipe temperature transfer capability. These regions, which may vary in size, may be used for mounting of low-power equipment. Thus, the Earth panel 7 may be used for mounting of equipment, as well as the transponder panels 5 and 6. The available mounting areas may therefore be more fully populated, with a resulting reduction in overall spacecraft size.

FIG. 6b is a detail of FIG. 6a, illustrating thermal components in a portion of the juncture of south transponder panel 6 and earth panel 7. Elements of FIG. 6b corresponding to those of FIG. 6a are designated by like reference numerals. In FIG. 6b, the cross-sectional exterior shape of the heat pipes is seen to be square. This provides flat surfaces for maximum heat transfer among the heat pipes. The 3-dimensional "J" shape precludes incorrect orientation during installation of the heat pipes. However, square cross-section is desirable, because the "J's" may be bent in the wrong plane, and even in a region of straight heat pipes using a rectangular cross-section other than square, adjacent heat pipes might be differently oriented, and the panel sheet would make good thermal contact with the "taller" pipe, but would have to deform away from a flat condition to contact the adjacent "shorter" heat pipe. As illustrated in FIG. 6b, heat pipe 512a, on panel 6 has a straight lower portion in contact with the straight upper portion of heat pipe 12a', its bottom portion 516a, in contact with header heat pipe 502, and its hook portion 518a, thermally free. Also in panel 6, heat pipe 512b, has its bottom portion 516b positioned adjacent header 502, and its hook portion 518b, positioned adjacent the straight portion of heat pipe 512a. On earth panel 7, a corresponding set of "J" shaped heat pipes 612, 6512, is similarly arranged. For example, heat pipe 612a' has a straight portion lying against a straight portion of a heat pipe 6512a4- , a bottom portion 666a' positioned somewhat offset, overlapping a portion of header heat pipe 512 and also a portion of the bottom portion 516a' of south panel 7 heat pipe 512a', and a free hook portion 668a. Similarly, another heat pipe 612b' of earth panel 7 includes a straight portion in thermal contact with a straight portion of a heat pipe 6512b', and also has a bottom portion 666b' lying in an overlapping relationship against both header heat pipe 502 and the bottom portion 516b' of heat pipe 512b', and further has its hook portion 668b' against the straight portion of heat pipe 612a'. The relationship of the other heat pipes of panels 6 and 7 in the region near header pipe 502 will be understood from FIG. 6b without additional description.

FIG. 6c is a view of the panel junction of FIG. 6b looking in the direction of section lines 6c–6c. In FIG. 6c, elements corresponding to those of FIG. 6b are designated by like reference numerals. Also, the letter "J" has been added to identify the "J"-shaped portion of a heat pipe, and the letter "H" identifies a header heat pipe. In FIG. 6c, the overlapping position of the "J" bottom portion 666d, relative to header heat pipe 502 and the "J" bottom portion 516d, is evident.

South transponder panel 6 as illustrated in FIG. 6c is fastened to earth panel 7 by fasteners, designated generally as 680, which connect through panel 6 (and an extension designated 6', if desired) into a flange 670 associated with panel 7. A thermally conductive grease, or other thermally conductive material or gasket, may be applied between the flange and panel 6 to improve heat transfer in heat transfer region 695. One thermally conductive material currently being evaluated is Grafoil, a sheet gasket material produced by Union Carbide.

FIG. 6d illustrates another embodiment, similar to FIG. 6c, but in which two additional header heat pipes 602 provide increased heat transfer along the junction, and an additional set of heat pipes 603 extends through earth panel 7, to increase the heat flow capacity. FIG. 6e shows yet another embodiment, with two header heat pipes and two "J" portions in earth panel 7, and with two header heat pipes and one "J" section in the adjacent south transponder panel 6.

When prior art spacecraft panels support electrical equipment such as RF power amplifiers, they also include controllable heaters associated with each amplifier, which heaters are designated to dissipate about the same amount of heat as the associated RF power amplifier. When an amplifier has its energizing power removed, as when it is taken off-line, the associated heater is switched on, to thereby help to maintain thermal balance. Since the spacecraft bus is intended to be readily used with different payloads, it is advantageous to do away with the individual heaters for each piece of electrical equipment. Instead, a feedback heat control system is associated with each panel. The heat control systems uses thermostats and heaters, represented by 72 of FIG. 2a, located on the inside surfaces of north and south transponder panels 5 and 6, and on the inside surface of earth panel 7. One heater is ordinarily provided for each heat pipe of a network of heat pipes. The set-point temperature and available power are based upon a detailed study of the payload.

FIG. 7 tabulates the characteristics of three spacecraft members of a set of communications spacecraft, intended to launch on three different launch vehicles. The three different versions are designated by column headings 1a, 1b and 1c. As tabulated in Row I, the launch vehicles are Atlas II, Delta II, and Ariane 4. The characteristics of the spacecraft bus and payload in Rows II through V are self-evident. The payload set of Row VI represents the number of communication channels, the design transmission watts per channel, and the frequency band. Thus, in the "1a" column, the spacecraft carries 24 12-watt C-band amplifiers, and another 24 60-watt Ku-band amplifiers, for a total of 48 channels. The antennas listed in Row VIII of FIG. 7 are dual-surface (DUAL SURF), frequency reuse by polarization diversity types. The 1a column lists a total of 2 antennas, each with a reflector diameter ($\phi$) of 85 inches. The other two versions tabulated in FIG. 7 each carry one dual-surface 60-inch diameter reflector. The remaining items in FIG. 7 are self-explanatory.

FIGS. 8a, 8b and 8c are simplified elevation outline views of the three spacecraft tabulated in columns 1a, 1b and 1c of FIG. 7, respectively, mounted on their boosters, ready for launch.

SUMMARY OF THE INVENTION

Cylindrical battery cell vessels are coupled together in plural sets by pairs of half-shell sleeves. The sleeves conduct heat preferentially in an axial direction. Each sleeve set is mounted onto a heat rejection plate for direct radiation to space. Each satellite of a set of spacecraft has a North and/or South-facing region for mounting the heat rejection plates of the requisite number of cells. Each plate may be fitted with an optical solar reflector (OSR) for reflecting insolation, and for radiating heat energy.

DESCRIPTION OF THE DRAWING

FIG. 4b represents a range of lengths of the core module, FIG. 4c represents a range of lengths of fuel tanks, FIGS. 4d, 4e, 4f and 4g represent ranges of sizes of transponder panels, solar array panels, oxidizer tanks, and heat pipe assemblies, respectively, and FIG. 4h tabulates some of the principal differences among members of a set of spacecraft.

FIG. 5a is a cross-section of a honeycomb panel, FIG. 5b is an elevation view of the interior of the panel of FIG. 5a in a square configuration, which illustrates details of heat pipes elongated parallel to the axis.

FIG. 6c is a cross-sectional view of one embodiment of the juncture of two panels of FIG. 6a, and FIGS. 6d and 6e represent alternative embodiments;

FIG. 7 tabulates the characteristics of three different spacecraft members of a set of spacecraft, designed for launch on three different launch vehicles;

FIG. 9b is a perspective or isometric view of a clamp which may be used in FIG. 9a, FIG. 9c is an elevation view of a half-sleeve array of FIG. 1a, and FIG. 9d is an end view thereof, FIG. 9e is a view of the space-facing side of a radiator panel of FIG. 9a, and FIG. 9f is a perspective or isometric view of an array of assemblies of FIG. 9a, mounted in place on the spacecraft of FIG. 2a.

DESCRIPTION OF THE INVENTION

The battery which stores electricity for the satellite is made up of a plurality of nickel-hydrogen battery cells, each of which is enclosed in a pressure vessel, to contain internal pressures which may reach as high as 2500 PSI. Heat is generated in each cell during charge and discharge.

Figure 1:
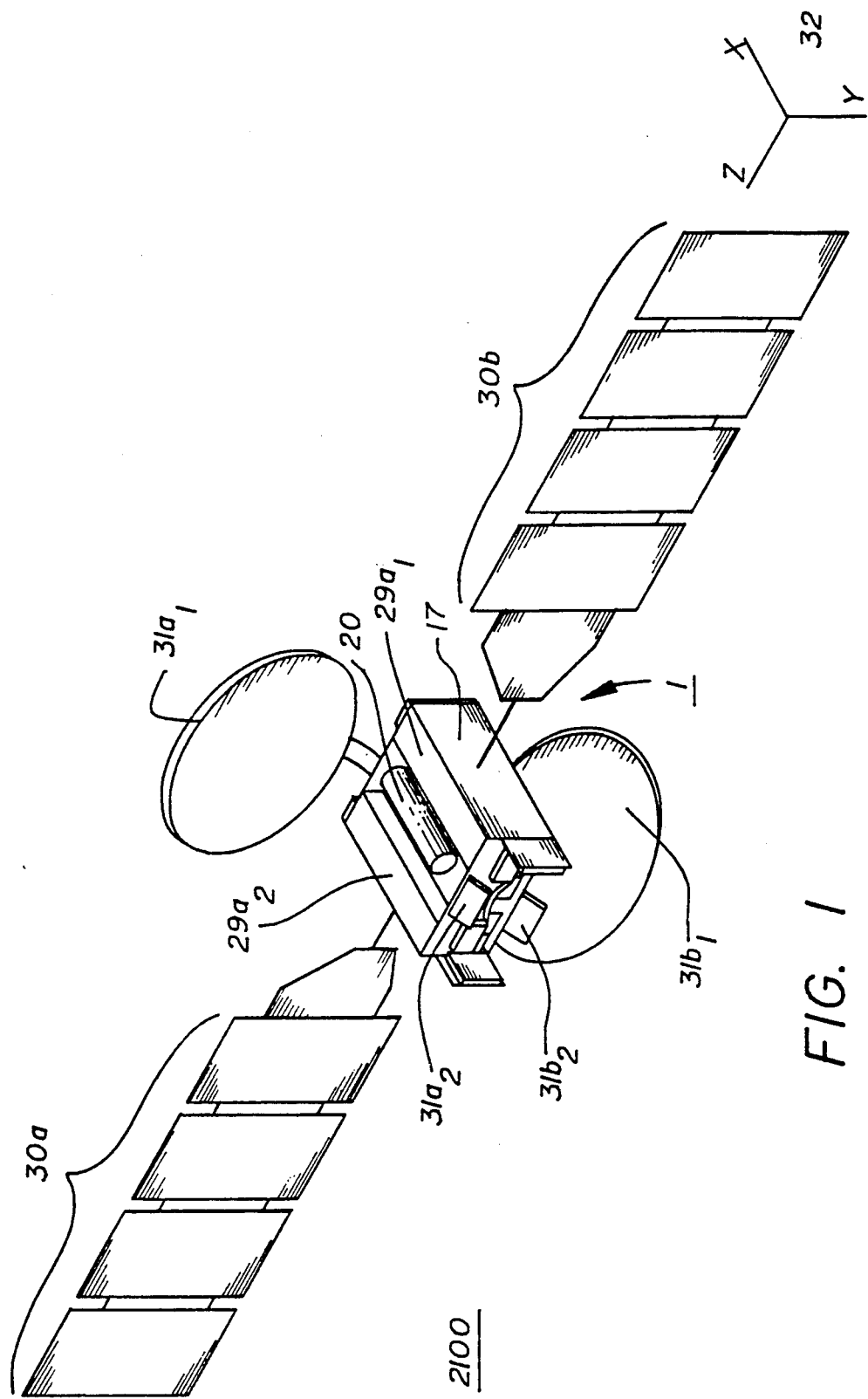
FIG. 1 is a simplified perspective of isometric view of a spacecraft, with solar panels and particular antennas deployed.
Figure 2A:
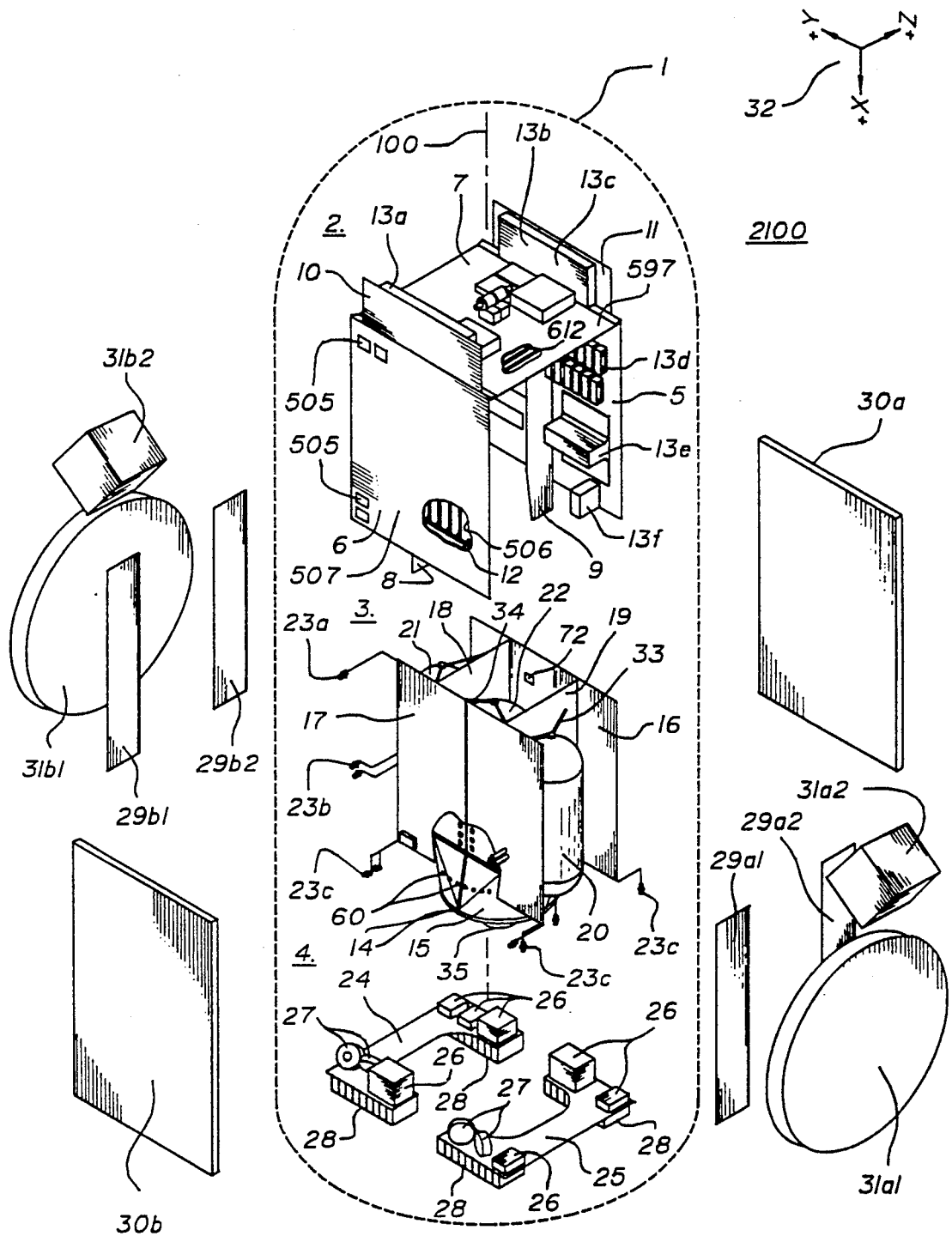
FIG. 2a is a simplified perspective or isometric view, partially exploded and partially cut away, of portions of the spacecraft of FIG. 1 in its stowed state.
Figure 2B:
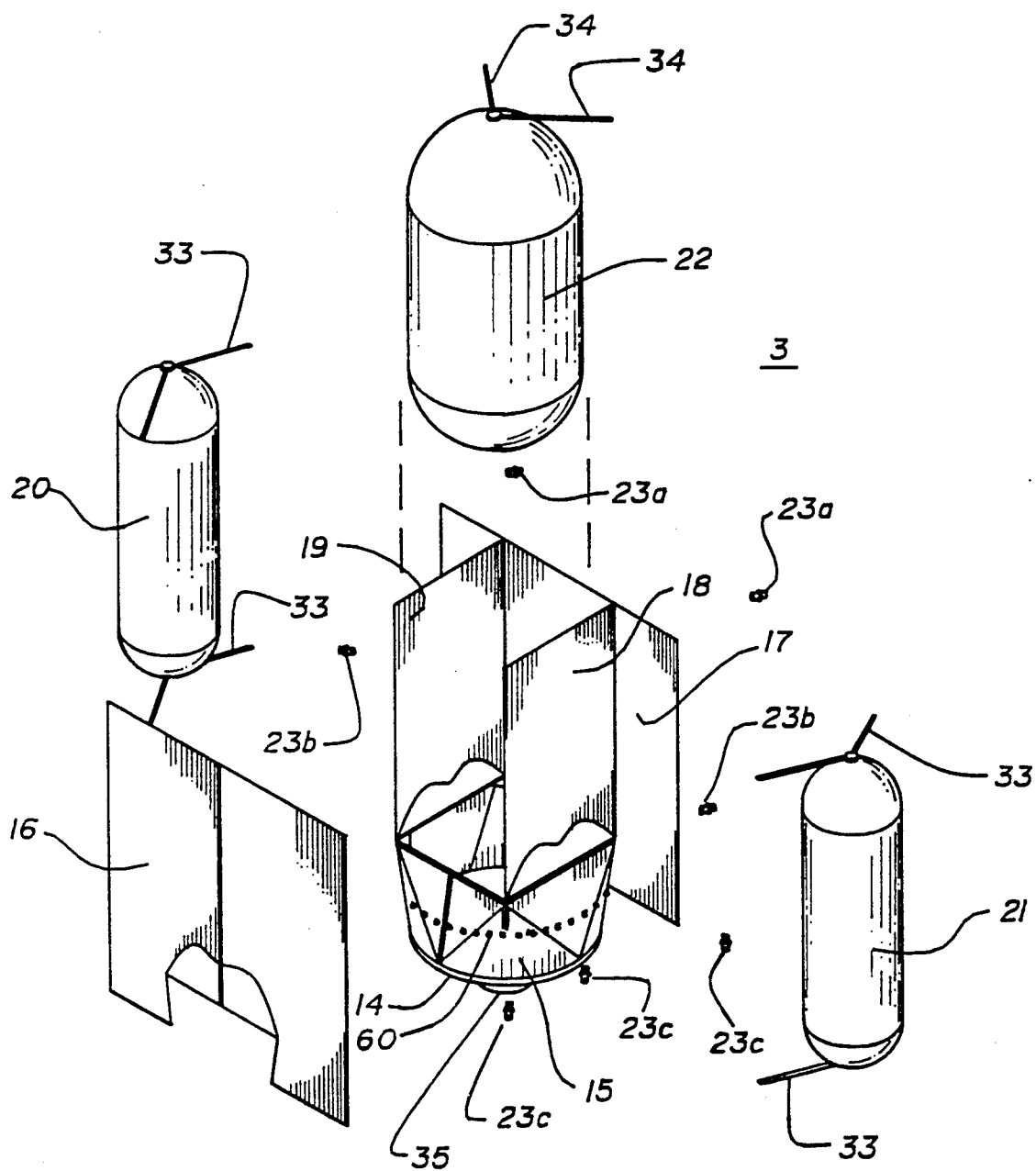
FIG. 2b is a corresponding view, further exploded, of a portion of FIG. 2a, and FIG. 2c illustrates the structural panels alone, exploded away from each other but in their relative positions, with their names and numeral designations.
Figures 3A, 3B, 3C, 3D:
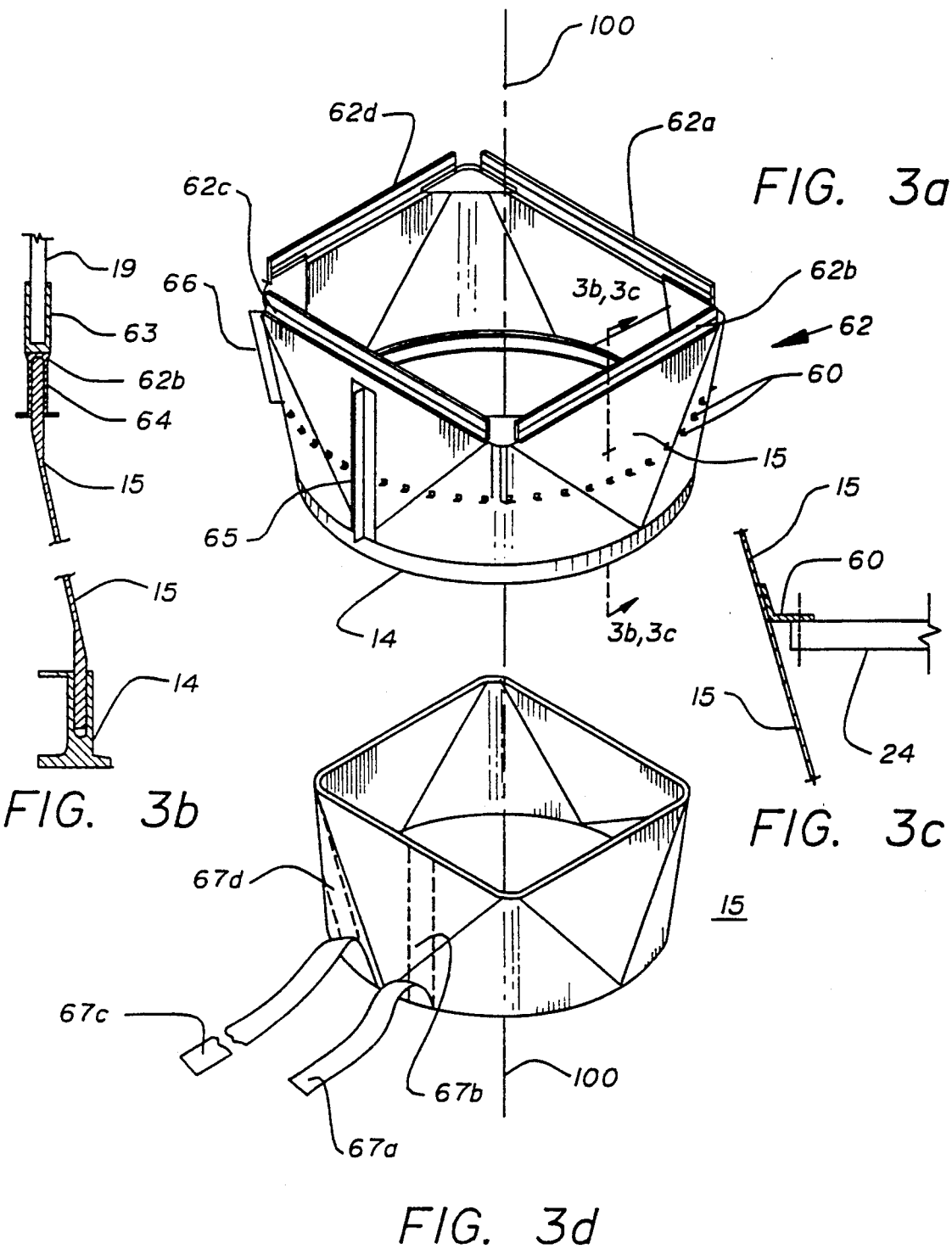
FIG. 3a is a simplified perspective or isometric view of a launch vehicle adapter ring and an associated transition support piece in accordance with an aspect of the invention.
FIGS. 3b and 3c are elevation cross-sections thereof illustrating interfaces between the transition and adjoining structures.
FIG. 3d illustrates the transition piece during a stage of construction, with pieces of reinforcing tape being applied parallel to, and skewed with the longitudinal axis.
Figure 4A:
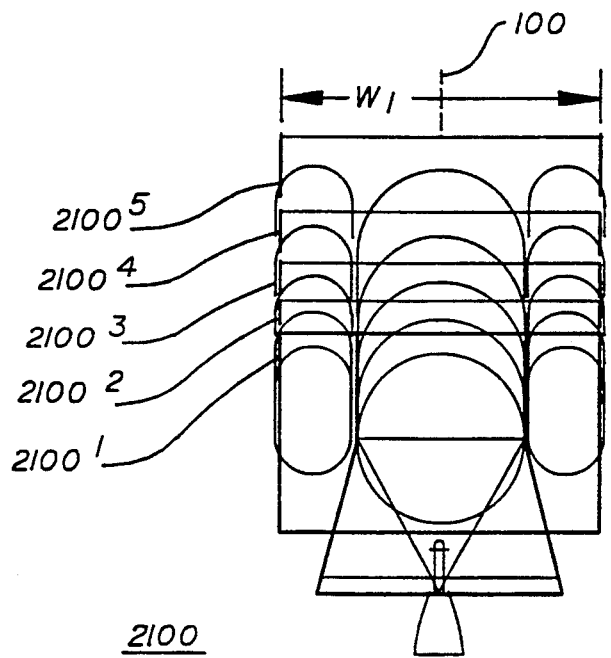
FIG. 4a represents various members of the set of spacecraft, in the form of several different possible configurations which are relatively axially extended by a fixed increment of distance.
Figures 4B, 4C:
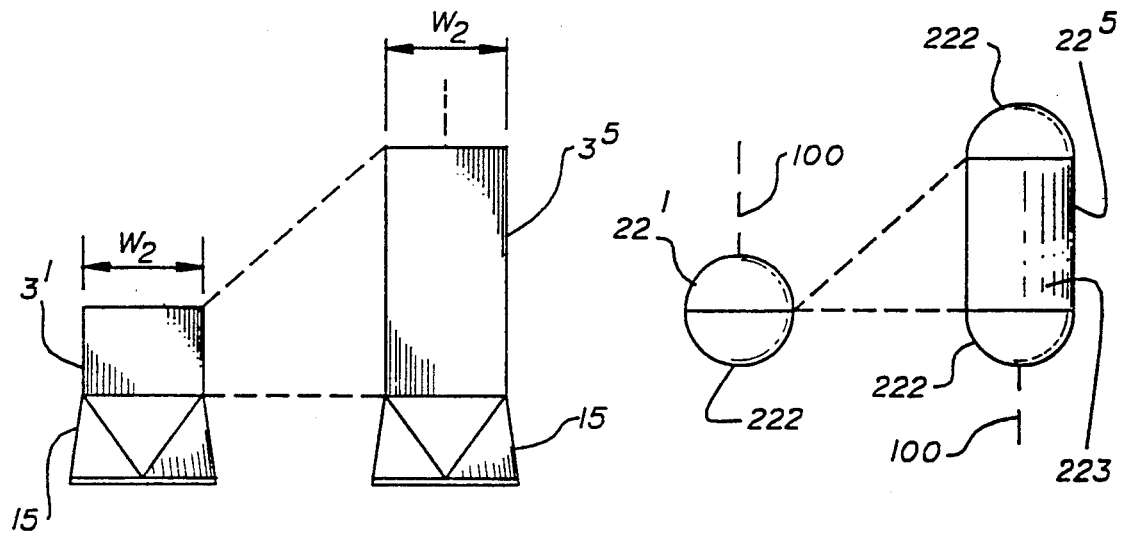
FIGS. 4b–4g represent various principal elements of the members of the set of spacecraft, having major dimensions parallel to the longitudinal axis.
Figure 4D:
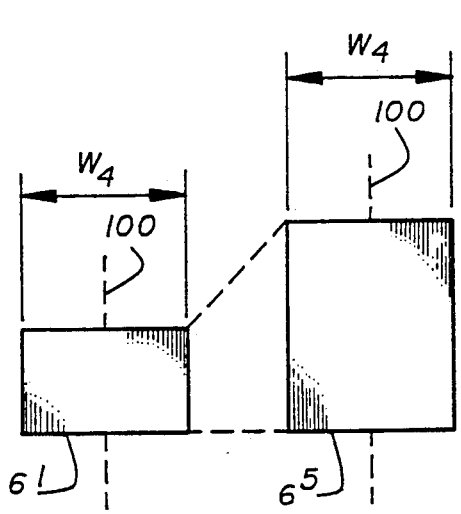
Figure 4E:
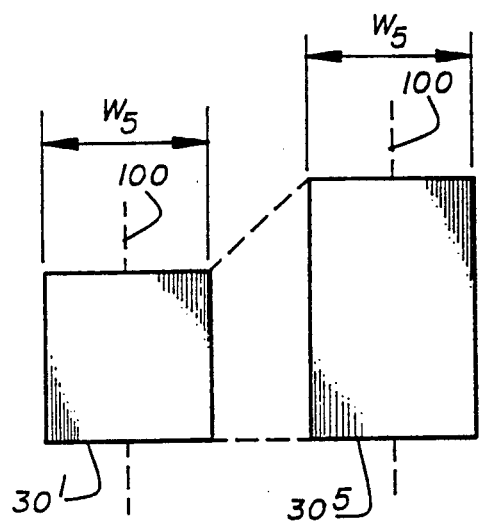
Figure 4F:
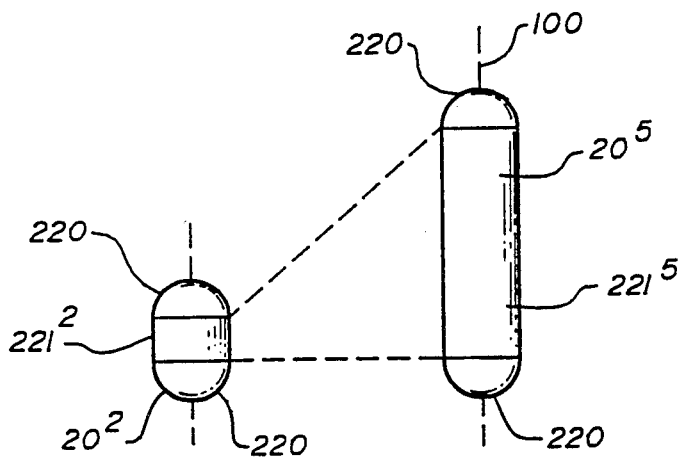
Figure 4G:
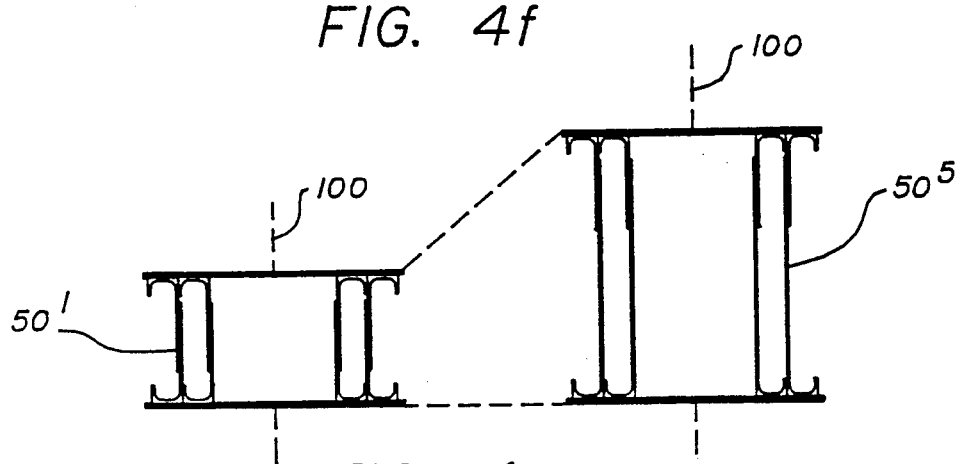
Figure 5D:
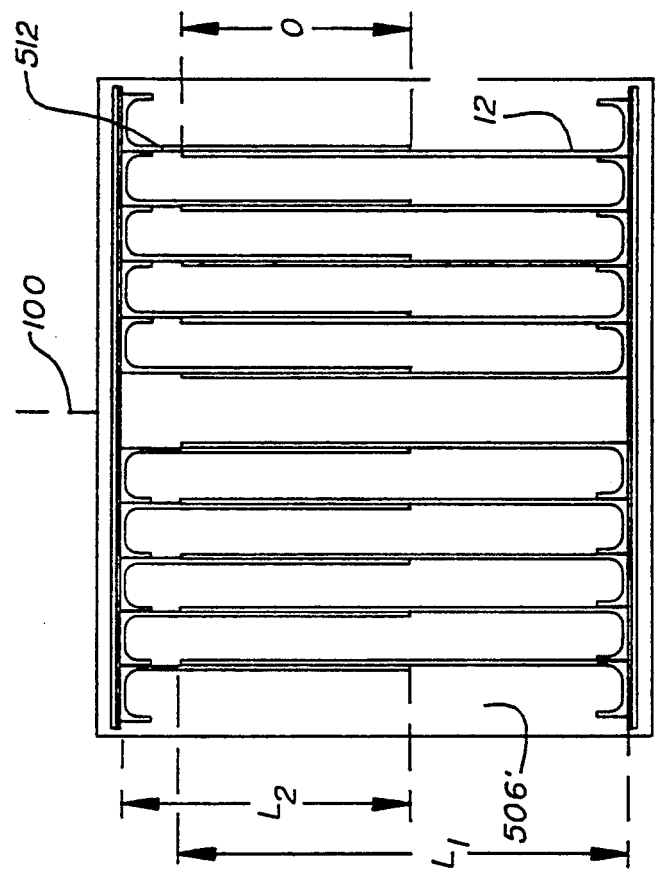
FIGS. 5c and 5d illustrate two alternative embodiments of heat pipe overlap configuration for an elongated panel configuration.
Figure 5C:
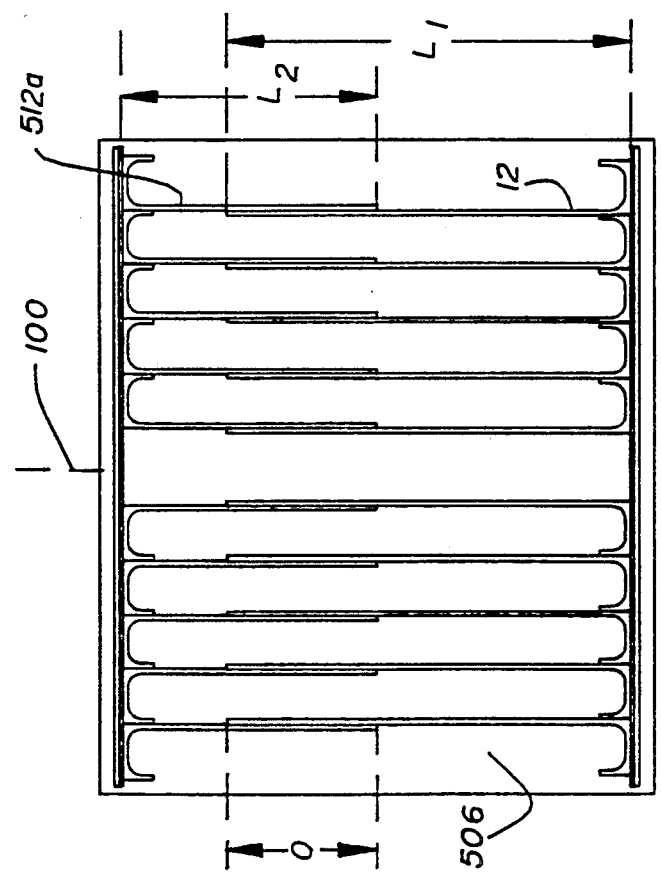
Figure 6A:
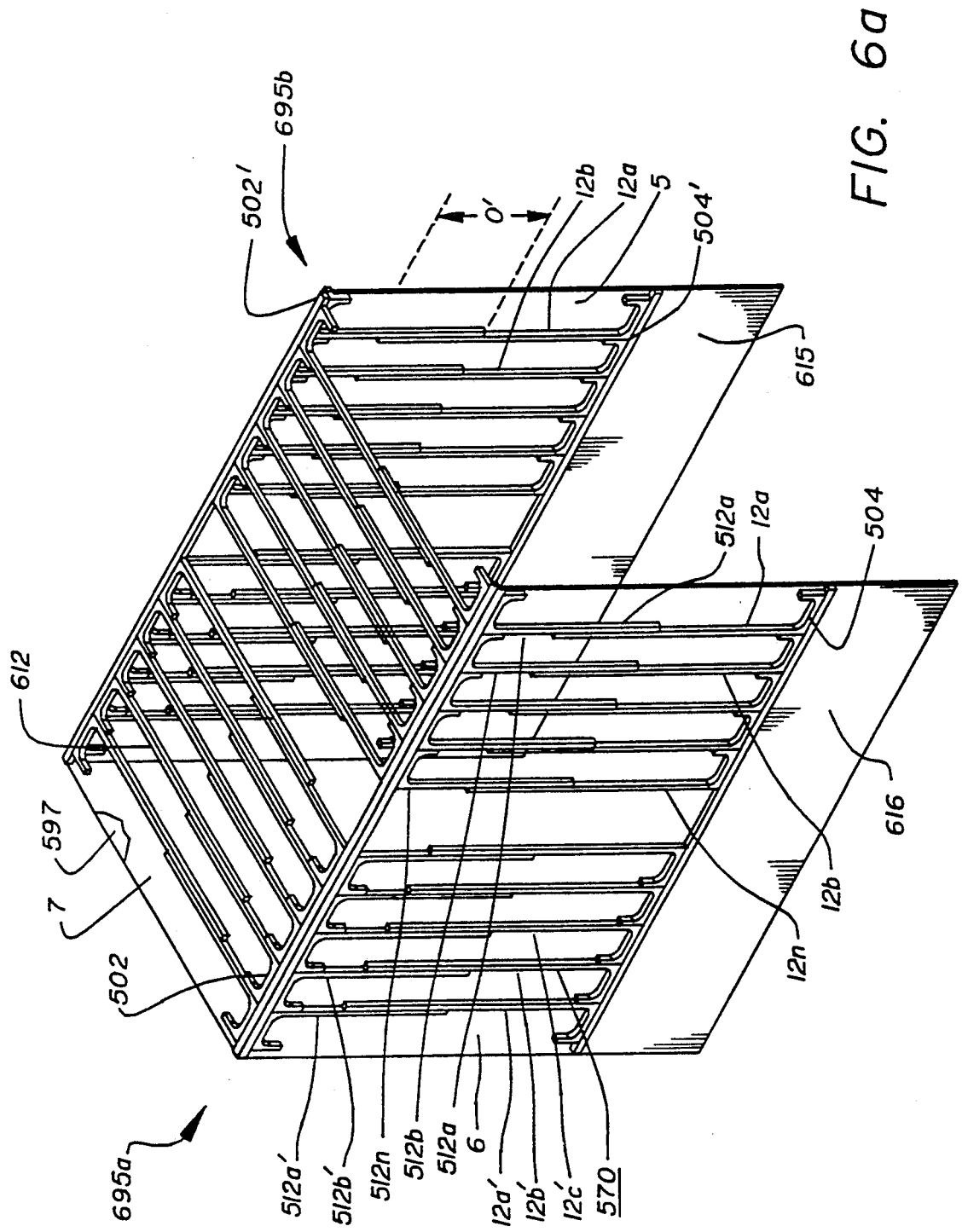
FIG. 6a is a simplified, skeletonized, perspective or isometric view of an assemblable-disassemblable 3-dimensional heat pipe arrangement for carrying heat among three panels of the spacecraft of FIG. 1.
Figure 6B:
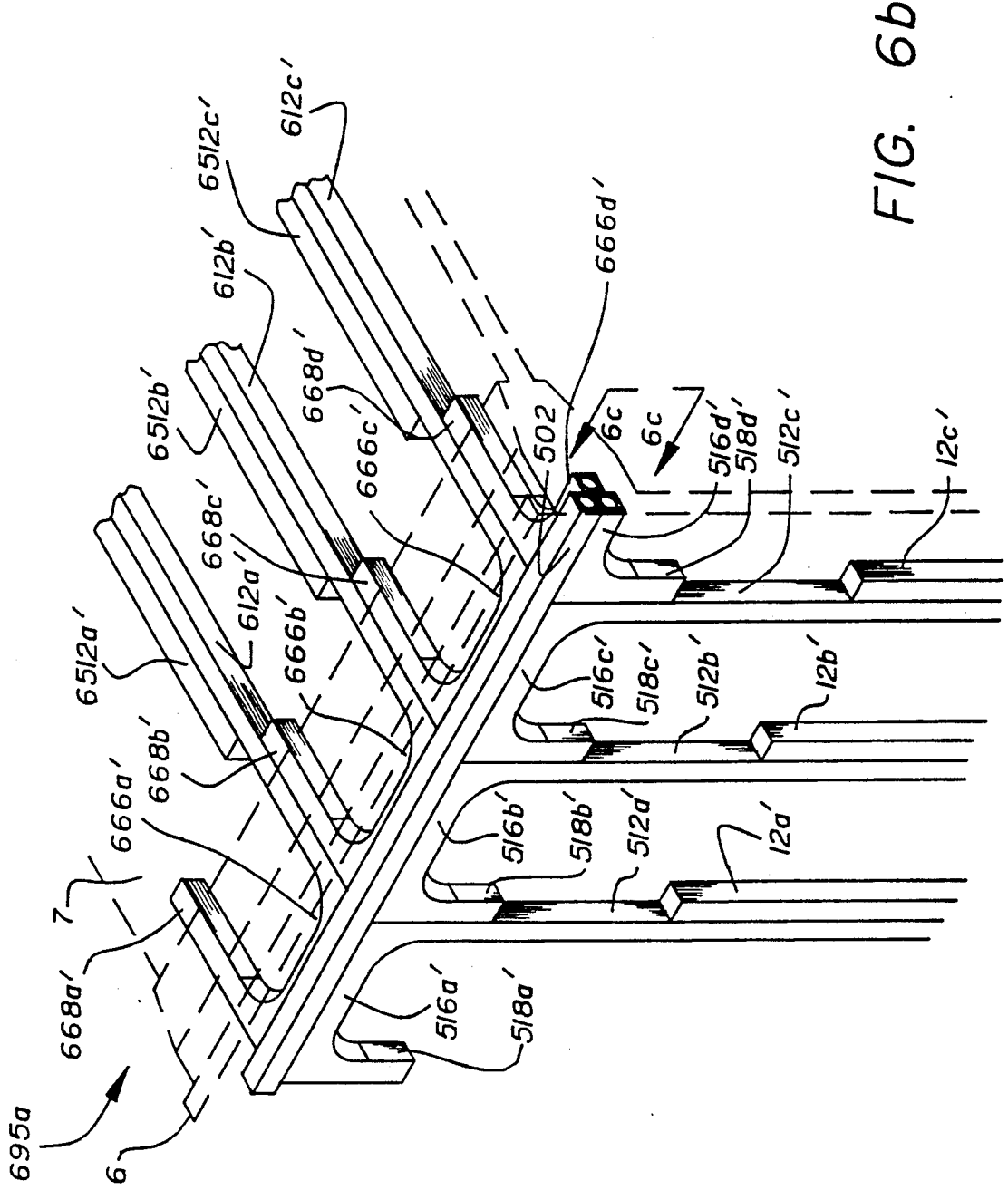
FIG. 6b is a simplified perspective or isometric view of a corner of the structure of FIG. 6a, partially in phantom, and partially cut away, to illustrate the relationship of the various heat pipes.
Figure 8C:
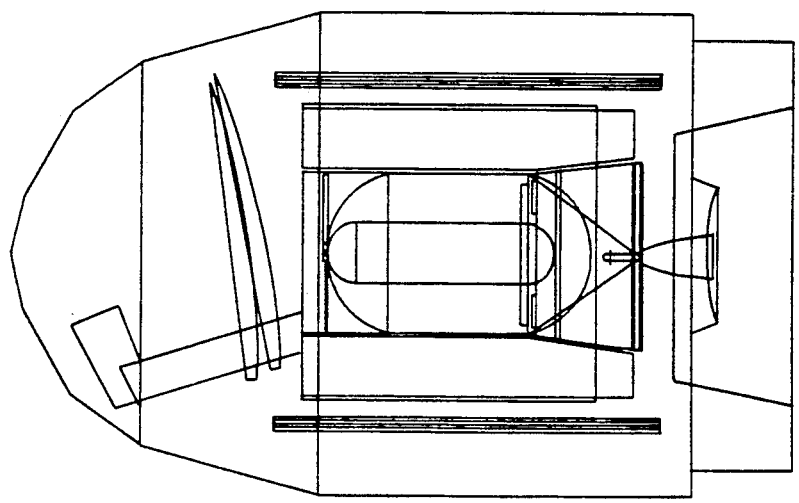
FIGS. 8a, 8b and 8c illustrate, in simplified elevation view, spacecraft of a set of spacecraft, associated with their launch vehicles.
Figure 8B:
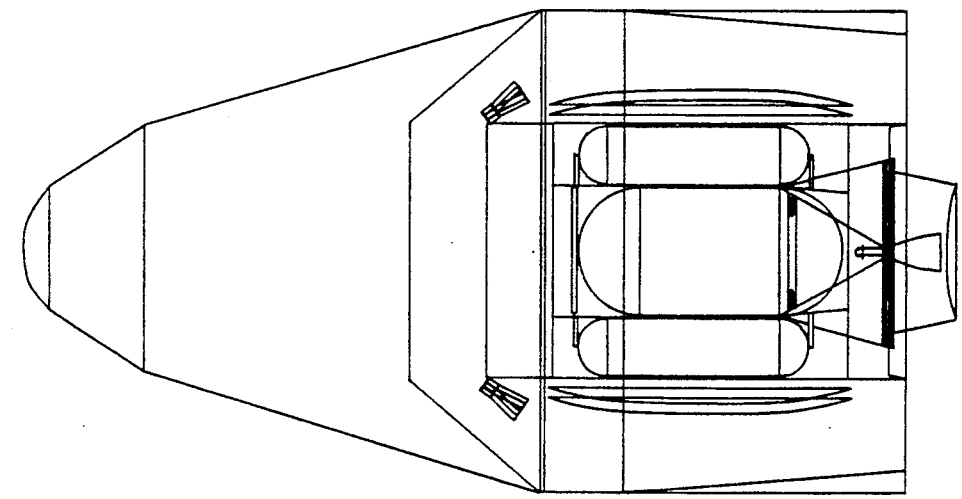
Figure 8A:
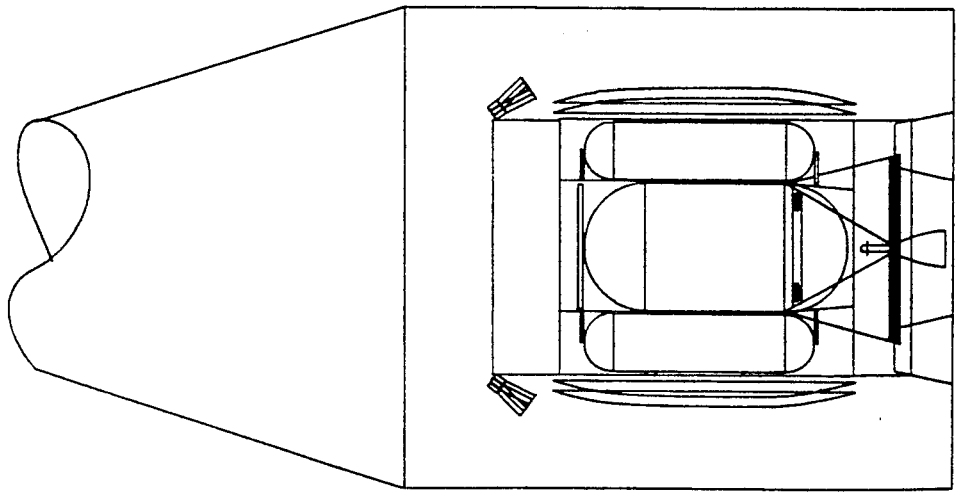
Figure 9A:
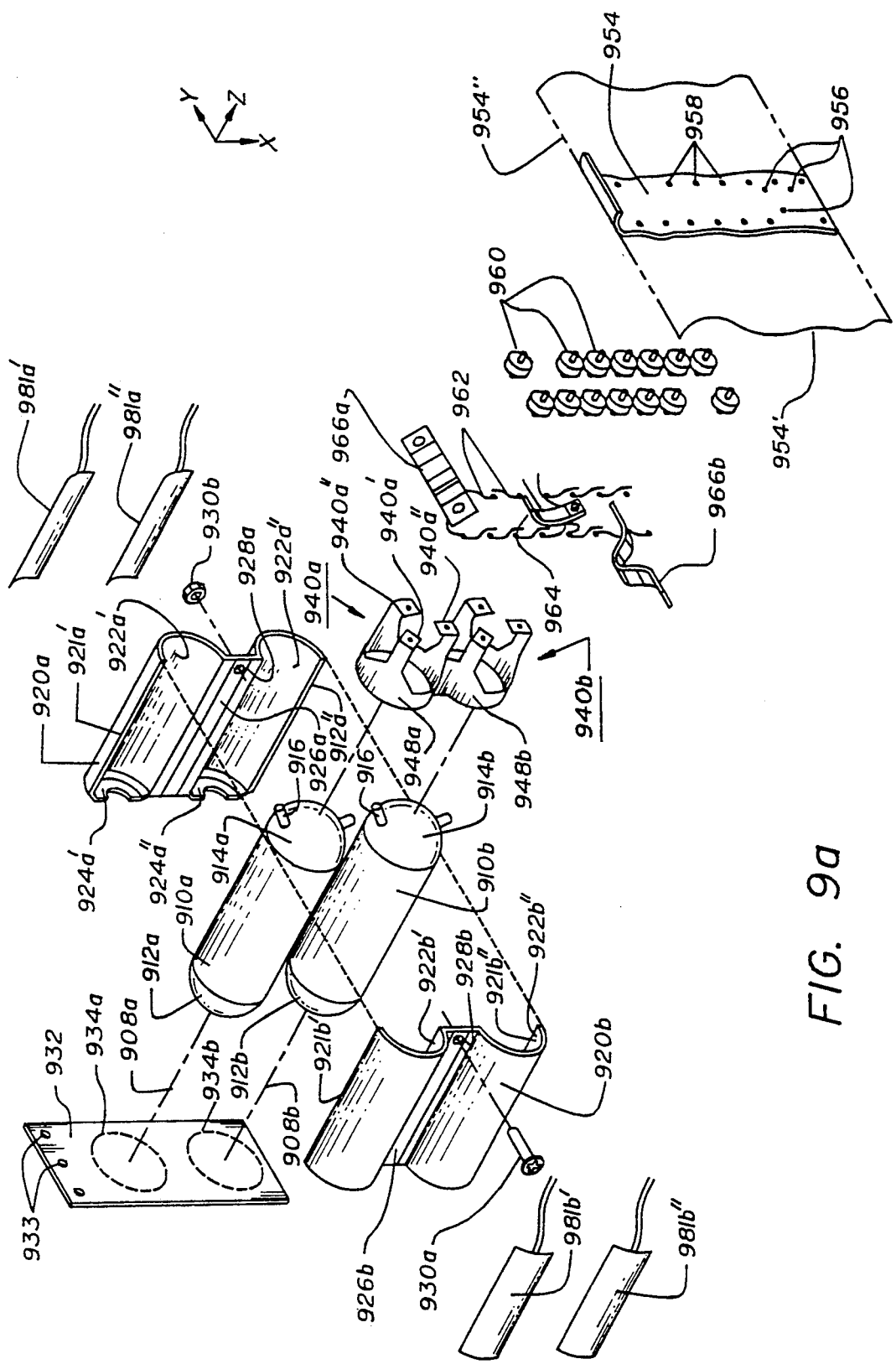
FIG. 9a is an exploded perspective or isometric view of an assembly of two battery cell pressure vessels according to the invention.

In FIG. 9a, a battery cell pressure vessel (PV) 910a has a metal body in the shape of a cylinder, symmetric about an axis 908a, with hemispherical metal ends 912a at the "bottom" and 914a at the "top". Top hemisphere 914 is fitted with a pair of "rabbit ear" electrical terminals 916 which are insulated from hemisphere 914a. PV 910a may contain one, two or possibly more battery cells, which may be connected in electrical series or in parallel. A second PV includes a cylindrical body 910b symmetrical about an axis 908b, with hemispheric ends 912b and 914b, and corresponding terminals.

A first sleeve array 920a of FIG. 9a is a monolithic, unitary, electrically insulating structure defining a pair of half-shells or half-sleeves designated 922a, and 922a", which are essentially portions, not exceeding 180°, of circular sleeves dimensioned to closely fit about the exterior of cylindrical PV bodies 910a and 910b, respectively, and also defining flanges 924a, and 924a", A second sleeve array 920b, also seen in FIGS. 9c and 9d, is a mirror image of the structure of sleeve array 920a, which when assembled with sleeve array 920a makes up two joined, mutually parallel sleeves dimensioned to accept the bodies of PVs 910a and 910b of FIG. 9a. An elongated flat surface 926a lies between sleeve halves 922a, and 922a" of half-sleeve array 920a, and defines a hole 928a. A similar surface 926b and hole 928b lie between sleeve halves 922b' and 922b" of half-sleeve array 920b. When half-sleeve arrays 920a and 920b are assembled, flat surfaces 926a and 926b abut, and matching holes 928a, 928b allow a bolt 930a and nut 930b to aid in holding the halves together, with PVs 910a and 910b removably held therewithin, and with an outer seam extending along joined edges 921a, and 921b, and joined edges 921a'' and 921b''.

The two-sleeve assembly of FIG. 9a as so far described, which is the joined combination of half-sleeve arrays 920a and 920b, is adhesively affixed to a radiating plate 932, by bonding flange portion 924a' and its mating half (not visible in FIG. 9a) to plate 932 at the location indicated by dotted circle 934a, and flange portion 924a'', together with its mating half (also not visible), at the location on plate 932 indicated by dotted circle 934b. The adhesive bonding of flanges 924a, and 924a'' to plate 932 provides support at one end of the sleeve arrays, preventing the half-sleeves from separating along the outer seams. Each radiating plate 932 defines a plurality of mounting screw apertures 933. Bolt 920b hold the half-sleeve arrays together along central surfaces 926a and 926b. Further support to prevent separation along the seams is provided by first and second clamps 940a and 940b. Clamp 940a is illustrated in more detail in FIG. 9b, and includes a clamp band 948a and a pair of tabs 950a, and 950a'', each of which tabs defines an aperture 952c', 952a'', respectively, for clearing clamp bolt 920b. Clamp 940a also includes three mounting posts 942a', 942a'' and 942c'' jutting from clamp band 948a, each with a bracket 944a', 944a'', and 944a''', respectively. Each bracket 944a', 944a'', 944a''' defines an aperture 946a', 946a'', and 946a''', respectively, dimensioned for clearing a diode plate mounting bolt (not illustrated). Clamp 940b is identical to clamp 940a. Mounting posts 942 and brackets 940 are located so that, when the clamp is affixed to the PV assembly, they do not interfere with the protruding pressure vessel terminals 916.

In accordance with an aspect of the invention, the half-sleeve arrays 920 are made from carbon-fiber reinforced resin, with the directions of the axes of at least some of the fibers longitudinal, parallel to axis 908a. More particularly, FIG. 9c and 9d are elevation and end views, respectively, of half-sleeve array 920b of FIG. 9a, with corresponding parts designated by like reference numerals. In FIG. 9c, arrows 968 represent the axis directions of triaxial reinforcing carbon or graphite filaments in the composite material. As illustrated, some filaments are parallel with axis 908b, some are at +30°, and others at −30°. Such structures may be made, as known, by laying up "prepreg" tape (a tape made up of longitudinal reinforcing filaments preimpregnated with uncured resin) over a form or mandrel, and then curing. In one embodiment of the invention, ten plies of 0.005-inch tape are used, in the sequence 0°, +30°, 0°, −30°, 0°, 0°, −30°, 0°, +30°, 0°, with each flange laid up as an integral continuation of the associated sleeve half. This construction has the salient advantage of preferential thermal conduction in the longitudinal direction. Heat from the pressure vessel passes through the thin, broad side of each sleeve, and is conducted with low thermal resistance to the flange, where it is transferred through the broad flange surface to radiating plate 932. Clamps 940a and 940b are preferably made from a lightweight, electrically nonconductive composite such as glass-reinforced epoxy.

Referring to FIGS. 9a and 9b, clamps 940a and 940b have their clamp bands 948a and 948b fitted about the ends of half-sleeve arrays 920a and 920b, with their tab apertures 952a and 952b aligned with apertures 928a and 928b of the sleeve arrays. Bolt 920b extends through apertures 928a, 928b, and through the apertures 952a' and 952a'' of both clamps 940a and 940b, six apertures in all, and is retained by nut 930b. When tightened, the nut clamps the bands 948 of each clamp 940a and 940b about the half-sleeve arrays 920a and 920b, holding them together. Thus, the half-sleeve arrays are held together by adhesive at radiating plate 932, and at the other end by clamps 940a and 940b.

Mounting brackets 944a', 944a'', and 944a''' of clamp 940a of FIG. 9a, and corresponding brackets of clamp 940b, mount the pressure vessel assembly to a diode mounting plate 954. Mounting plate 954 may be individual to battery cell pressure vessels 910a and 910b, or may be part of a large plate used for a plurality of such sets, as suggested by phantom lines 954' and 954''. In either case, diode mounting plate 954 includes holes, such as 956, in a pattern matching holes 946a', 946a'' and 946a''' of the clamps, through which mounting bolts hold the diode mounting plate to the clamp brackets.

A thin, flat electrical heater element illustrated as 981a, in FIG. 9a is affixed to the exterior surface of sleeve 921a' of half-sleeve array 920a. Heater 981a, is a thin resistive strip formed on a flexible dielectric substrate by etching, with a laminated dielectric insulation. Similar heater elements 981a'', 981b', and 981b'' are affixed to the outer surfaces of half-sleeve portions 922a'', 922b', and 922b'', respectively. Heaters 981 may be independently energized, or connected in common for joint operation, to maintain the battery temperature no lower than a minimum temperature, as is known in the art. Nickel-hydrogen cells are desirably maintained above −10° C.

As illustrated in FIG. 9a, diode mounting plate 954 includes a plurality of further apertures, some of which are designated 958, for mounting diodes, some of which are designated 960. If plate 954 is electrically conductive, each diode 960 may be mounted using insulating hardware, as known. As many as seven diodes may be used per pressure vessel, depending upon the magnitude of the charging and discharging current, diode voltage-current characteristics, and the like. Electrical interconnections among diodes 960 are provided by electrical conductors, some of which are represented as 962. A first electrical conductor or bar 964 interconnects adjacent terminals 916 of pressure vessels 910a and 910b, to interconnect the battery cells therein, ordinarily in electrical series. A further pair of electrical conductors or bars 966a and 966b provide intraconnections between terminals 916 of pressure cells 910a and 910b and the terminals of adjacent sets of pressure vessels (not illustrated). Electrical conductors 962 interconnect diodes 960, and diodes 960 with electrical bars 964 and 966a and b.

Figure 9F:
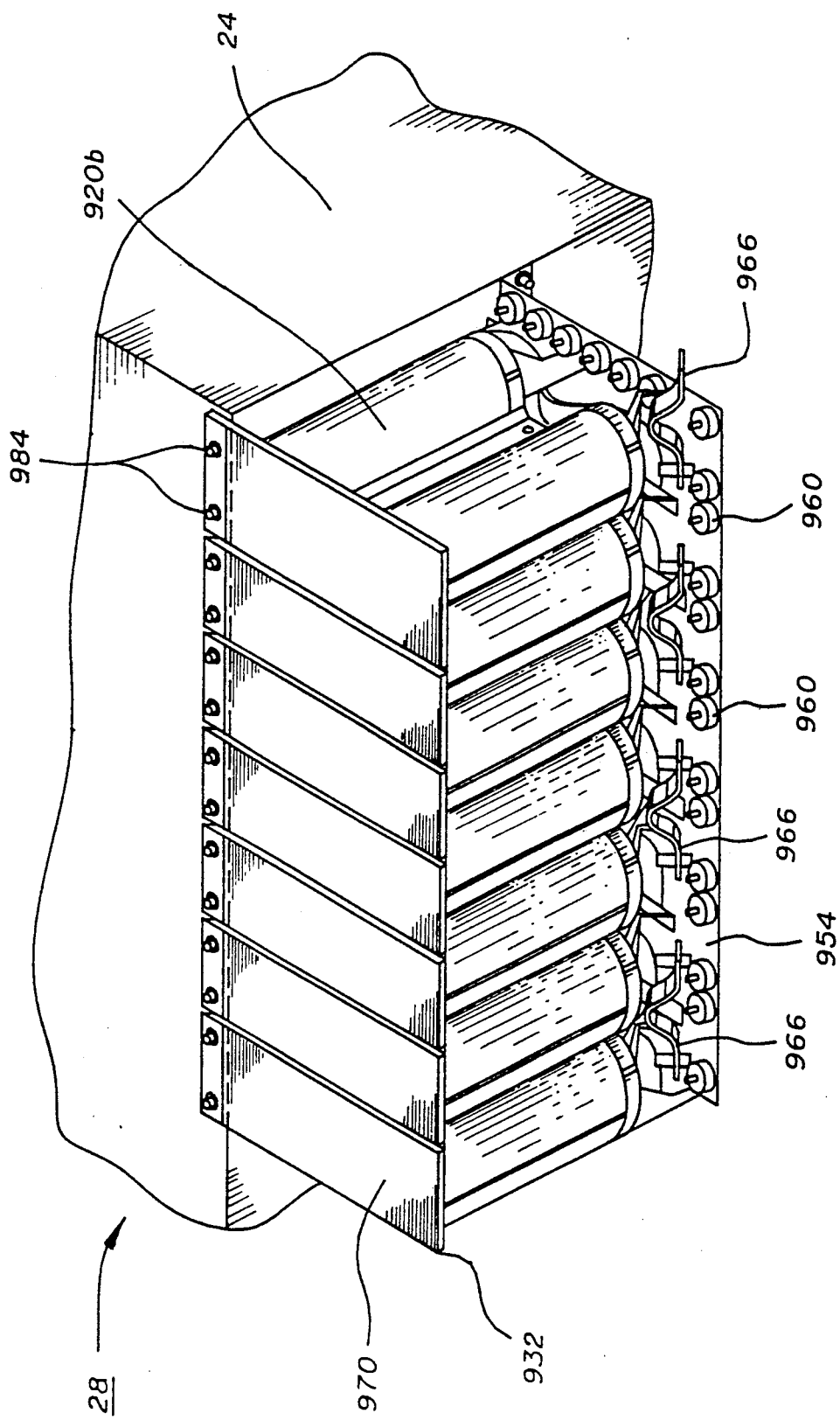

The space-facing side of radiator plate 932 is visible in FIG. 9e. An optical solar reflector (OSR) is mounted on the reverse side of radiating plate 932. As known, an OSR radiates heat energy, and reflects light. Any OSR may be used, such as a conventional metallized glass plate, with the metallization side bonded to the space-facing side of radiating plate 932. OSR 970 aids plate 932 to radiate heat originating from the associated battery cell pressure vessels, while reflecting sunlight. While one large OSR plate is illustrated, several smaller OSRs may be used. FIG. 9f is a perspective or isometric view of fourteen battery pressure vessels arranged as described, in seven sets of two. Each set of two is associated with its own radiating plate, and the radiating plates are arrayed side-by-side on the spacecraft, and are mounted to the spacecraft by screws, some of which are illustrated as 984, which extend through the radiating plate mounting holes. Several such fourteen-pressure-vessel sets may be used on one spacecraft.

Each pair of vessels, assembled as described, can be readily removed from the spacecraft by removing the radiating plate mounting screws, the bracket-to-diode-mounting-plate screws, and the electrical connection bars, thereby leaving diode mounting plate 954, the diodes and the diode interconnection conductors, and the remainder of the pressure vessels.

Other embodiments of the invention will be apparent to those skilled in the art. While the described structure is an assembly of two pressure vessels, any number may be assembled together.

What is claimed is:

1. A spacecraft, comprising:
   an electrical battery, said battery comprising a plurality of cells, each of said cells being within a vessel taking the physical form of a circular cylinder with first and second convex curved ends, each of said vessels including a pair of terminals associated with said first convex curved end; and
   vessel mounting and heat radiating means, said vessel mounting and heat radiating means comprising:
   (a) a radiator plate including first and second surfaces, said first surface being mounted on said spacecraft at a location facing open space, and being associated with an optical solar reflection means for tending to reflect insolation and for efficiently radiating heat;
   (b) sleeve means for holding a plurality of said vessels in parallel, side-by-side relationship, said sleeve means including a pair of monolithic integral half-sleeve arrays, each of said half-sleeve arrays comprising a plurality of portions, each said portions not exceeding a 180° segment of a cylindrical sleeve having a diameter substantially equal to the diameter of one of said cells, each of the axes of said portions of cylindrical sleeves being parallel to a common axis and defining first and second ends, said pair of half-sleeve arrays together forming a plurality of cylindrical sleeves dimensioned for accommodating a like plurality of said vessels, for holding said plurality of vessels in a mutually parallel relationship and for transferring heat from said vessels;
   (c) mounting means associated with said sleeve means and with said radiator plate for mounting said sleeve means to said plate with said first ends of said portions of said cylindrical sleeves juxtaposed to said second surface of said radiator panel in heat-transferring relationship therewith, with said axes of said vessels perpendicular to said plate.

2. A spacecraft according to claim 1, wherein said sleeve means comprises a thermally anisotropic material, with a direction of easy heat flow oriented parallel to said common axis.

3. A spacecraft according to claim 2, wherein said anisotropic material comprises a solidified-liquid-impregnated reinforcing fiber.

4. A spacecraft according to claim 3, wherein said reinforcing fiber is carbon fiber.

5. A spacecraft according to claim 3, wherein said reinforcing fiber lies substantially parallel to said common axis over at least a portion of the length of said sleeve means.

6. A spacecraft according to claim 3, wherein the axes of said reinforcing fiber are at 30° relative to said common axis.

7. A spacecraft according to claim 1, wherein said plurality is two.

8. A spacecraft according to claim 2, wherein said mounting means comprises:
   a flange monolithically integral with said first end of at least one of said half-sleeve arrays; and
   means for coupling said flange to said plate.

9. A spacecraft according to claim 8, wherein said means for coupling comprises adhesive means.

10. A spacecraft according to claim 1, wherein said optical solar reflection means comprises a metallized glass plate affixed to the space-facing side of said radiator plate.

11. A spacecraft according to claim 1, further comprising clamping means coupled about said second end of at least a portion of said pair of half-sleeve arrays, for aiding in holding said half-sleeve arrays together.

12. A spacecraft according to claim 11, further comprising:
   radiator plate holding means for holding said radiator plate to said spacecraft; and
   clamp holding means for holding said clamp to said spacecraft.

* * * * *